(12) United States Patent
Saida et al.

(10) Patent No.: US 7,218,425 B2
(45) Date of Patent: May 15, 2007

(54) DUST AND/OR DIRT DETECTION IN IMAGE READING APPARATUS HAVING READ-WHILE-FEED FUNCTION

(75) Inventors: Tadaaki Saida, Chiba (JP); Yoshihito Osari, Chiba (JP); Akinobu Nishikata, Chiba (JP); Nobuo Sekiguchi, Ibaraki (JP); Rieko Akiba, Kanagawa (JP); Yuichiro Maeda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 10/022,861

(22) Filed: Dec. 13, 2001

(65) Prior Publication Data

US 2002/0075523 A1    Jun. 20, 2002

(30) Foreign Application Priority Data

Dec. 15, 2000 (JP) .............................. 2000-382841
Dec. 15, 2000 (JP) .............................. 2000-382847

(51) Int. Cl.
*H04N 1/00* (2006.01)
(52) U.S. Cl. ...................... 358/437; 358/463; 358/474; 382/108; 382/317
(58) Field of Classification Search ................ 358/437, 358/463, 474; 382/108, 317
See application file for complete search history.

(56) References Cited

U.S. PATENT DOCUMENTS

| | | | | |
|---|---|---|---|---|
| 5,568,573 A | * | 10/1996 | Wada et al. ................. | 382/317 |
| 5,930,008 A | | 7/1999 | Nabeshima et al. | |
| 5,956,161 A | * | 9/1999 | Takashimizu et al. ....... | 358/496 |
| 6,563,938 B1 | * | 5/2003 | Harada ......................... | 382/108 |
| 6,565,938 B1 | | 5/2003 | Toyosumi et al. | |
| 6,600,579 B1 | * | 7/2003 | Kumagai et al. ............ | 358/474 |

FOREIGN PATENT DOCUMENTS

| | | |
|---|---|---|
| JP | 10-56542 | 3/1989 |
| JP | 2000-78368 | 3/1990 |
| JP | 2-186870 | 7/1990 |
| JP | 5-30297 | 5/1993 |
| JP | 5-199352 | 8/1993 |
| JP | 6-233062 | 8/1994 |
| JP | 9-197566 | 7/1997 |
| JP | 10-224570 | 8/1998 |
| JP | 11-213129 | 8/1999 |
| JP | 11-313198 | 11/1999 |
| JP | 2000-152008 | 5/2000 |
| JP | 2000-196814 | 7/2000 |
| JP | 2000-287017 | 10/2000 |
| JP | 2000-310820 | 11/2000 |
| JP | 2000-349964 | 12/2000 |

* cited by examiner

*Primary Examiner*—Kimberly Williams
*Assistant Examiner*—Michael Burleson
(74) *Attorney, Agent, or Firm*—Morgan & Finnegan LLP

(57) ABSTRACT

In image reading apparatus capable of performing a read-while-feed operation in which an original is read while being fed by an image sensor placed at a fixed position, presence/absence of dust and/or dirt on a platen is detected, and, in a case where dust and/or dirt are detected at all of a plurality of predetermined positions by said detector, the read-while-feed operation is inhibited and the presence of dust and/or dirt is notified to a user. When, removal of dust and/or dirt on the platen is detected in a state that the read-while-feed operation is inhibited, the read-while-feed operation is allowed.

22 Claims, 20 Drawing Sheets

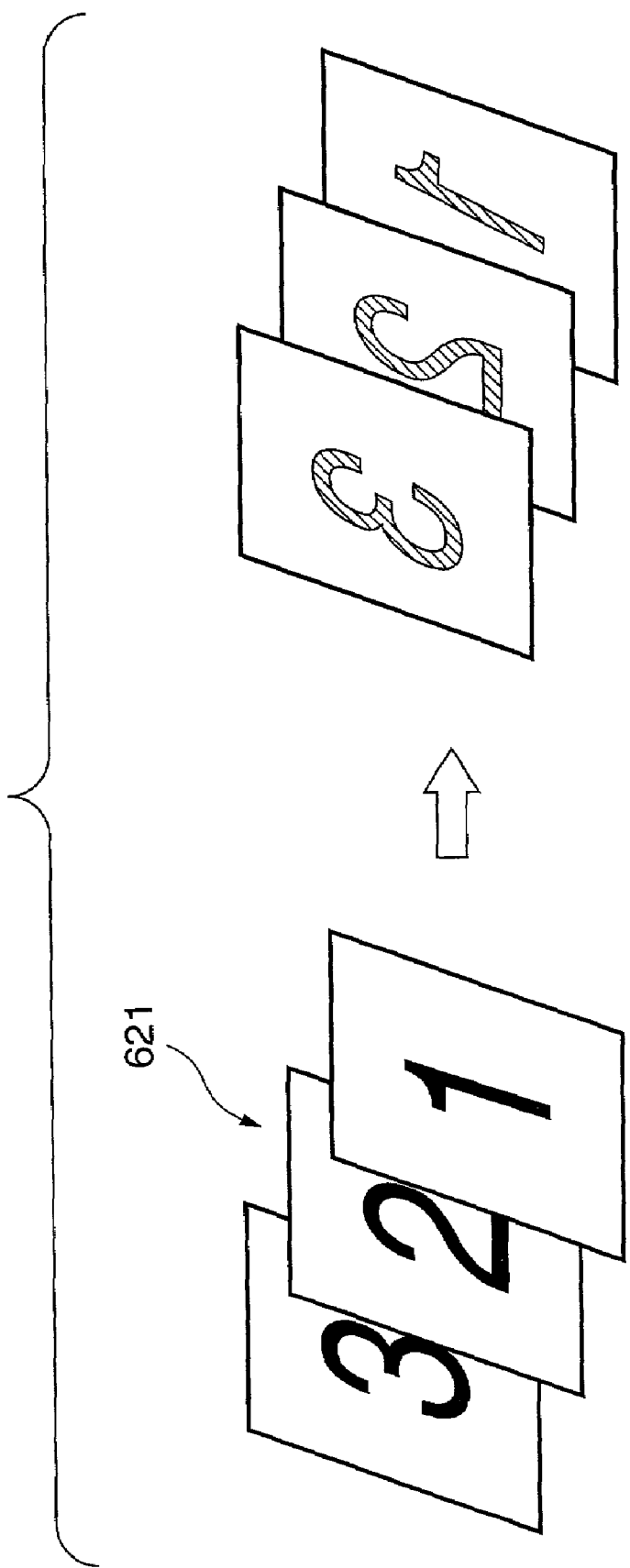

FIG. 16

PLATEN GLASS IS DIRTY. PLEASE CLEAN IT
(TO CLEAN PLATEN GLASS, PLEASE PRESS "CLEAN")

| CLEAN | OK |

DUST AND/OR DIRT DETECTION IN IMAGE READING APPARATUS HAVING READ-WHILE-FEED FUNCTION

FIELD OF THE INVENTION

The present invention relates to an image reading apparatus and control method therefore and, more particularly, to an image reading apparatus which reads an original while being fed and control method therefore.

BACKGROUND OF THE INVENTION

Conventionally, there are image reading apparatuses capable of reading an original in two different ways, i.e., reading an original stationarily placed on a platen glass by moving a scanner (referred to as "stationary reading operation" hereinafter), and reading an original by a scanner at a fixed position while feeding the original along the platen glass by an automatic document feeder (referred to as "read-while-feed operation" hereinafter) are known. This read-while-feed operation can shorten the reading time of entire originals as compared to the stationary reading method because original exchange and reading can be simultaneously performed, and the image reading section need not be returned to the home position to read the next original.

In the above-described read-while-feed operation, however, since an original image is read at a fixed position on the platen glass, black streaks may be formed on the read image due to dust or dirt between the platen glass and the original or on the lower surface of the platen glass, and an original image can not be read properly.

SUMMARY OF THE INVENTION

The present invention has been made in consideration of the above situation, and has as its object to enable to properly read an image of an original document even when dust and/or dirt are sticking to the platen glass.

According to the present invention, the foregoing object is attained by providing an image reading apparatus capable of performing a read-while-feed operation in which an original is read while being fed by an image sensor placed at a fixed position, comprising a detector adapted to detect presence/absence of dust and/or dirt on a platen, and a controller adapted to inhibit the read-while-feed operation in a case where dust and/or dirt are detected at all of a plurality of predetermined positions by the detector, notify the presence of dust and/or dirt via a notification unit, and allow the read-while-feed operation when removal of dust and/or dirt on the platen is detected in a state that the read-while-feed operation is inhibited.

According to the present invention, the foregoing object is also attained by providing an image reading apparatus capable of performing a read-while-feed operation in which an original is read while being fed by an image sensor placed at a fixed position, comprising a detector adapted to detect presence/absence of dust and/or dirt on a platen, a controller adapted to inhibit the read-while-feed operation in a case where the detector detects dust and/or dirt at all of a plurality of predetermined positions, and, in a case where the detector does not detect dust and/or dirt at least at one of the plurality of predetermined positions, control to perform the read-while-feed operation at the position where no dust or dirt is detected, and an operation unit adapted to designate disabling of the detector, wherein the controller disables the detector in response to the designation by the operation unit.

Further, the foregoing object is also attained by providing an image reading apparatus capable of performing a read-while-feed operation in which an original is read while being fed by an image sensor placed at a fixed position, comprising a detector adapted to detect presence/absence of dust and/or dirt on a platen, and a controller adapted to inhibit the read-while-feed operation in a case where the detector detects dust and/or dirt at all of a plurality of predetermined positions, and, in a case where the detector does not detect dust and/or dirt at least at one of the plurality of predetermined positions, control to perform the read-while-feed operation at the position where no dust or dirt is detected, wherein plural sets of positions are prepared for different sizes of originals to be read as the plurality of predetermined positions, and the controller controls the detector to perform the detection at a plurality of predetermined positions set in accordance with the size of the original.

Furthermore, the foregoing object is also attained by providing a control method for controlling an image reading apparatus capable of performing a read-while-feed operation in which an original is read while being fed by an image sensor placed at a fixed position, comprising detecting presence/absence of dust and/or dirt on a platen, inhibiting the read-while-feed operation in a case where dust and/or dirt are detected at all of a plurality of predetermined positions, notifying the presence of dust and/or dirt via a notification unit in a case where dust and/or dirt are detected at all of a plurality of predetermined positions, determining whether or not dust and/or dirt on the platen is removed in a state that the read-while-feed operation is inhibited, and allowing the read-while-feed operation when removal of dust and/or dirt on the platen is determined.

Further, the foregoing object is also attained by providing a control method for controlling an image reading apparatus capable of performing a read-while-feed operation in which an original is read while being fed by an image sensor placed at a fixed position, comprising detecting presence/absence of dust and/or dirt on a platen, inhibiting the read-while-feed operation in a case where dust and/or dirt are detected at all of a plurality of predetermined positions, and controlling, in a case where no dust or dirt is detected at least at one of the plurality of predetermined positions, to perform the read-while-feed operation at the position where no dust or dirt is detected, wherein the image reading apparatus comprises an operation unit adapted to designate skipping the detection of dust and/or dirt, and the detection of dust and/or dirt is skipped in response to the designation by the operation unit.

Further, the foregoing object is also attained by providing a control method for controlling an image reading apparatus capable of performing a read-while-feed operation in which an original is read while being fed by an image sensor placed at a fixed position, comprising detecting presence/absence of dust and/or dirt on a platen, inhibiting the read-while-feed operation in a case where dust and/or dirt are detected at all of a plurality of predetermined positions, and performing, in a case where no dust or dirt is detected at least at one of the plurality of predetermined positions, the read-while-feed operation at the position where no dust or dirt is detected, wherein plural sets of positions are prepared for different sizes of originals to be read as the plurality of predetermined positions, and the detection of dust and/or dirt is performed at a plurality of predetermined positions set in accordance with the size of the original.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing the direction of originals discharged from an original discharge port according to the embodiment of the present invention;

FIG. 16 is a view showing alarm display to prompt a user to clean an image reading position according to the embodiment of the present invention;

DETAILED DESCRIPTION OF THE PREFERRED EMBODIMENTS

Preferred embodiments of the present invention will be described in detail in accordance with the accompanying drawings.

<First Embodiment>

As an image reading apparatus according to the present invention, a digital copying machine will be described below.

Figure 1:
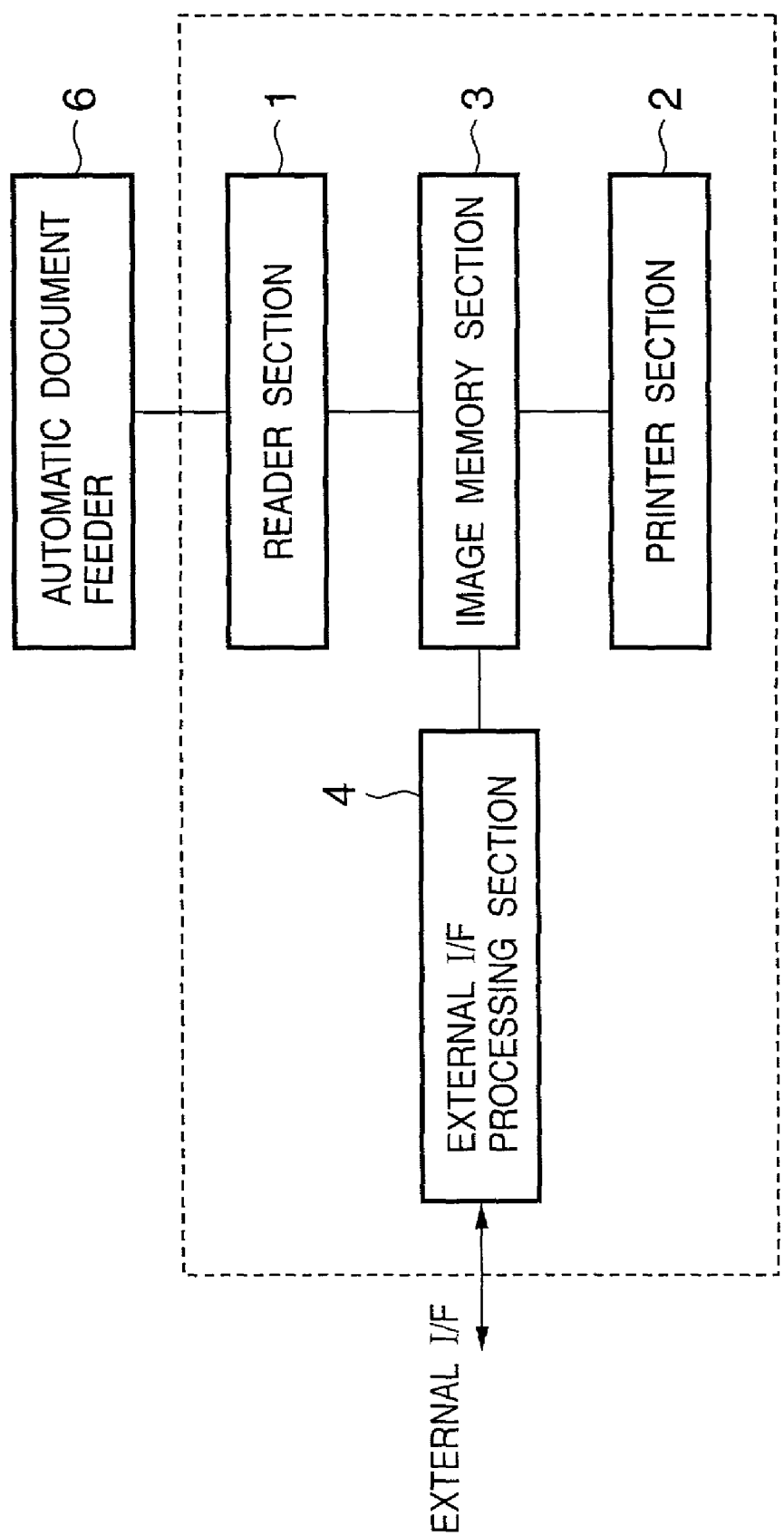
FIG. 1 is a block diagram showing an arrangement of a digital copying machine according to an embodiment of the present invention.

FIG. 1 is a block diagram showing the arrangement of a digital copying machine according to the first embodiment of the present invention. A reader section 1 reads the image of an original and outputs image data corresponding to the original image to an image memory section 3. A printer section 2 prints an image corresponding to the image data from the image memory section 3 on printing paper. The image memory section 3 compresses the image data transferred from the reader section 1 and stores the compressed image data, or expands the stored compressed image data and transfers the expanded image data to the printer section 2. The image memory section 3 also transfers stored image data to an external I/F processing section 4 or stores image data transferred from the external I/F processing section 4.

The external I/F processing section 4 executes predetermined processing for the image data transferred from the image memory section 3 and outputs the image data to an external device, or executes predetermined processing for image data sent from the external device and transfers the image data to the image memory section 3. An automatic document feeder 6 is connected to the reader section 1 to feed a placed original to a predetermined position.

Figure 2:
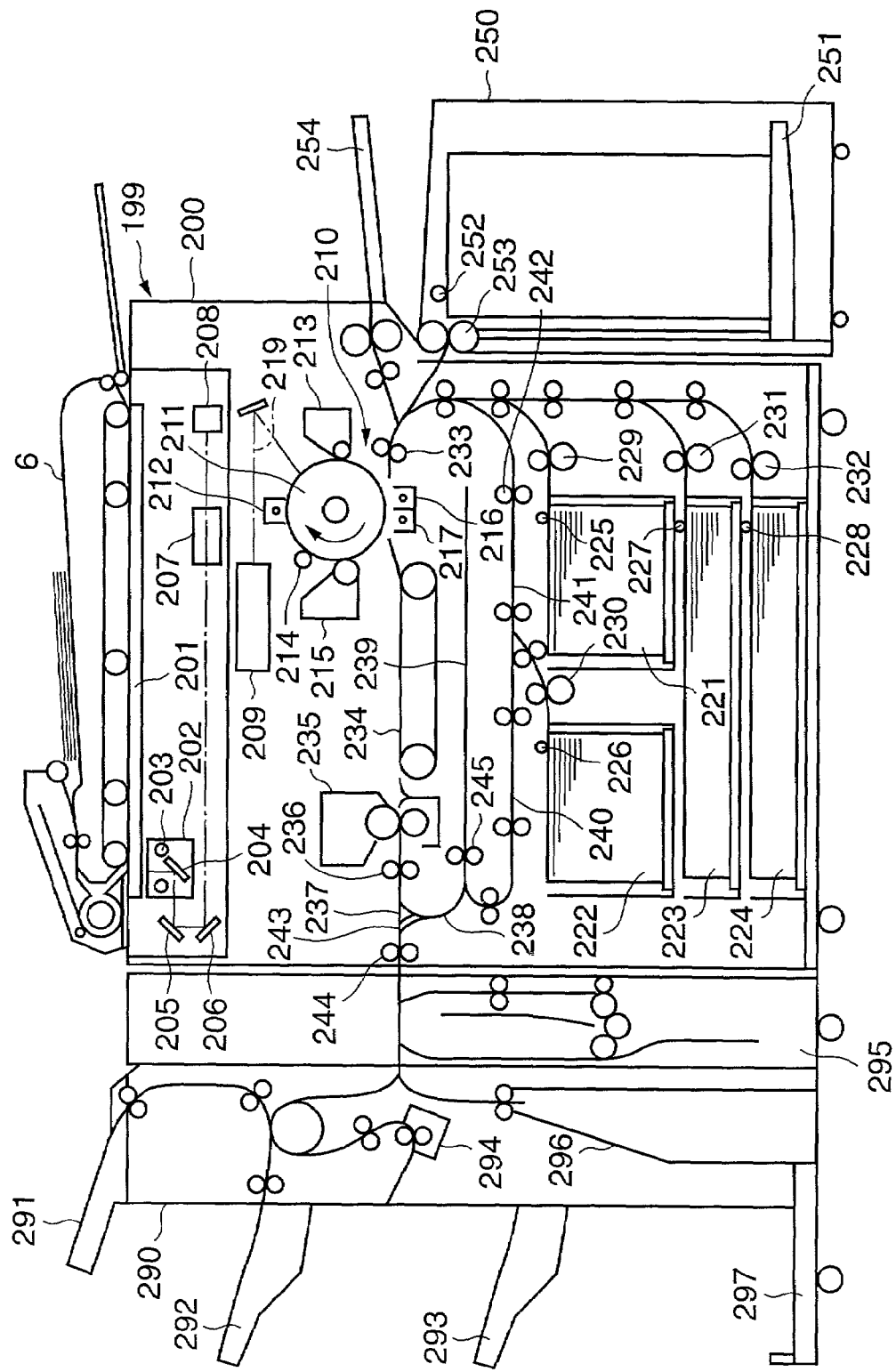
FIG. 2 is a sectional view of the digital copying machine according to the embodiment of the present invention.

FIG. 2 is a sectional view showing the digital copying machine of the present invention. Referring to FIG. 2, reference numeral 200 denotes a main body of a digital copying machine 199; 6, the automatic document feeder; 201, a platen glass serving as a platen; and 202, a scanner constituted by an original illumination lamp 203, scanning mirror 204, and the like. The scanner 202 is reciprocally moved by a motor (not shown) to send reflected light from an original through the scanning mirrors 204 to 206 and a lens 207, thereby forming an image on a CCD sensor in an image sensor 208.

An exposure control section 209 formed from a laser, polygon scanner, and the like irradiates an electrostatic drum 211 with a laser beam 219 that is modulated on the basis of an image signal converted into an electrical signal and has undergone predetermined image processing (to be described later) by the image sensor 208. A primary charger 212, developing unit 213, transfer charger 216, separation charger 217, pre-exposure lamp 214, and cleaning unit 215 are arranged around the electrostatic drum 211.

In an image forming unit 210, the electrostatic drum 211 is rotated by a motor (not shown) in a direction indicated by an arrow in FIG. 2. The electrostatic drum 211 is charged to a desired potential by the primary charger 212 and then irradiated with the laser beam 219 from the exposure control section 209 so that an electrostatic latent image is formed.

The electrostatic latent image formed on the electrostatic drum 211 is developed by the developing unit 213 and converted into a visible toner image.

On the other hand, a transfer paper sheet fed from a right cassette deck 221, left cassette deck 222, upper cassette 223, or lower cassette 224 by a pickup roller 225, 226, 227, or 228 is fed to the main body by feed rollers 229, 230, 231, or 232, and fed to a transfer belt by registration rollers 233. The visible toner image is transferred onto the transfer paper sheet by the transfer charger 216.

After transfer, residual toner on the electrostatic drum 211 is cleaned by the cleaning unit 215, and residual charges are erased by the pre-exposure lamp 214. After transfer, the transfer paper sheet is separated from the electrostatic drum 211 by the separation charger 217 and fed to a fixer 235 by a transfer belt 234. The transfer paper sheet is pressed and heated by the fixer 235 to fix the toner image and then discharged outside the main body 200 by discharge rollers 236.

A deck 250 capable of storing, e.g., about 4,000 transfer paper sheets is arranged on the right side of the main body 200. A lifter 251 of the deck 250 moves upward in accordance with the amount of transfer paper such that a transfer paper sheet always abuts against a pickup roller 252. The transfer paper sheet is fed to the main body by feed rollers 253. A multiple manual feed tray 254 capable of storing 100 transfer paper sheets is also arranged. Further, a discharge flapper 237 switches between a convey path 238 and a discharge path 243.

Reference numeral 240 denotes a lower convey path. A transfer paper sheet fed from the discharge rollers 236 is turned and guided to a re-feed path 241 through an inverting path 239. A transfer paper sheet fed from the left cassette deck 222 by the feed rollers 230 is also guided to the re-feed path 241. Re-feed rollers 242 re-feeds a transfer paper sheet to the image forming unit 210.

Discharge rollers 244 arranged near the discharge flapper 237 discharge a transfer paper sheet passed through the discharge path 243 from the copying machine. In a double-side printing (double-side copy) mode, the discharge flapper 237 is moved upward to guide a printed transfer paper sheet to the re-feed path 241 through the convey path 238, inverting path 239, and lower convey path 240. At this time, the transfer paper sheet is pulled into the inverting path 239 by inverting rollers 245 until the trailing edge of the transfer paper sheet is completely removed from the convey path 238, and the transfer paper sheet engages with the inverting rollers 245. Then, the inverting rollers 245 are rotated in reverse directions to send the transfer paper sheet to the lower convey path 240.

To invert and discharge a transfer paper sheet from the main body, the discharge flapper 237 is moved upward. The transfer paper sheet is pulled into the inverting path 239 by the inverting rollers 245 while leaving the trailing edge of the transfer paper sheet in the convey path 238. Then, the inverting rollers 245 are rotated in reverse directions to turn the transfer paper sheet and send it to the discharge roller 244.

In a discharge processing unit 290, transfer paper sheets discharged from the main body 200 of the digital copying machine one by one are stacked and aligned on a processing tray 294. When a set of paper sheets is discharged, the transfer paper sheets are stapled and discharged to a discharge tray 292 or 293. The discharge tray 293 is moved upward or downward by a motor (not shown) to the processing tray position before the start of image forming operation. Partition paper sheets to be inserted between discharged transfer paper sheets are stacked on a paper tray 291. A Z-folder 295 Z-folds discharged transfer paper sheets. A binder 296 folds a set of discharged transfer paper sheets at the center and stables the sheets to bind them. The bound paper sheets are discharged to a discharge tray 297.

Figure 3:
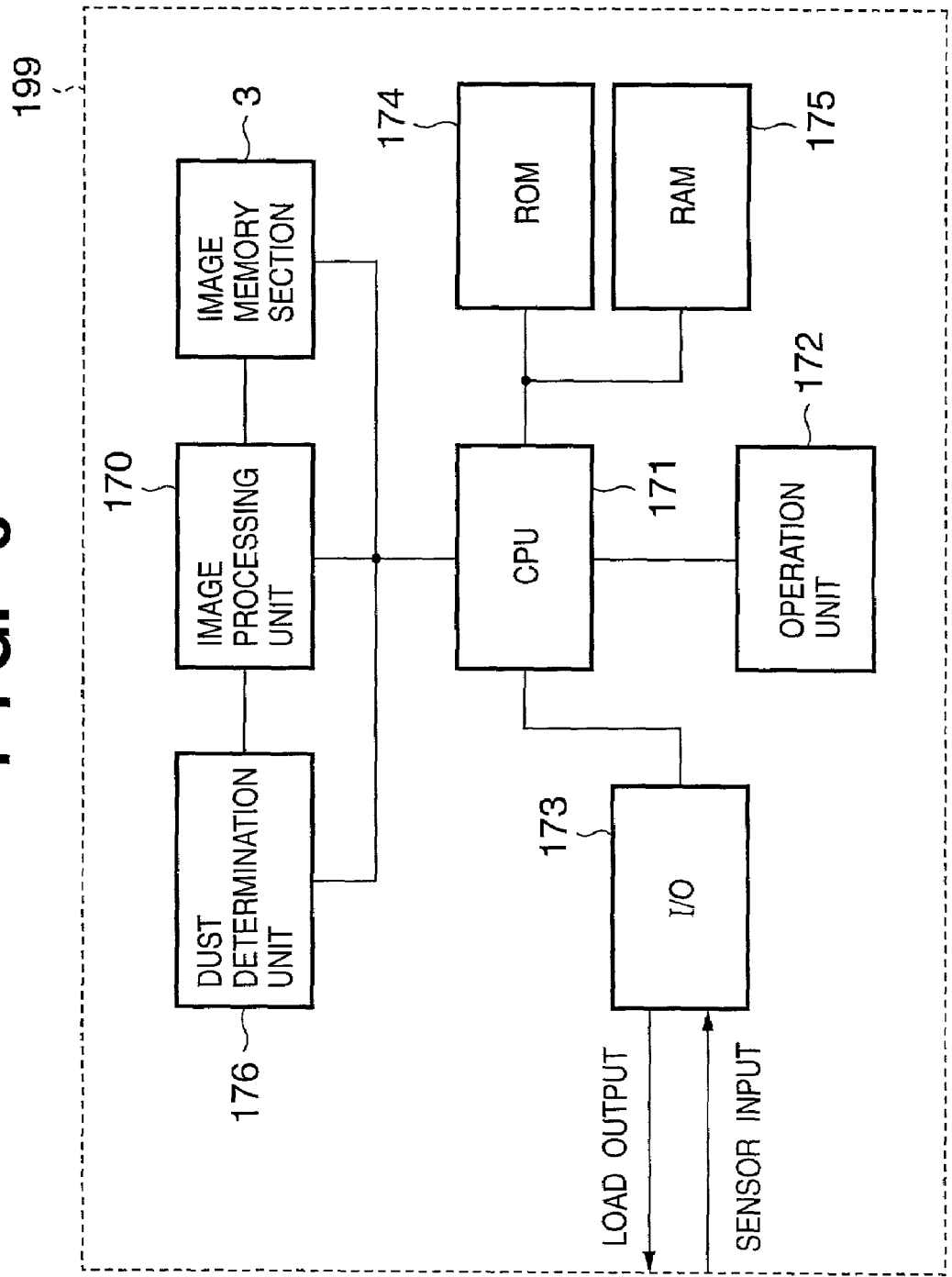
FIG. 3 is a block diagram showing control functions of the digital copying machine according to the embodiment of the present invention.

FIG. 3 is a control block diagram in the digital copying machine 199. Referring to FIG. 3, a CPU 171 executes basic control of the digital copying machine 199. A ROM 174 with a control program written, a work RAM 175 used to execute processing, and an input/output port 173 are connected to the CPU 171 through address and data buses. The input/output port 173 is connected to various kinds of loads (not shown) for controlling the digital copying machine 199, such as a motor and clutch, and the input (not shown) of a sensor for detecting the paper position.

The CPU 171 sequentially controls input/output through the input/output port 173 in accordance with the contents of the ROM 174, thereby executing image forming operation. An operation unit 172 is connected to the CPU 171. The CPU 171 controls a display unit and key input unit of the operation unit 172. An operator instructs the CPU 171 to switch display between the image forming mode, the scanner reading mode, and the print output mode through the key input unit. The CPU 171 displays the state of the digital copying machine 199 and operation mode setting by key input.

The CPU 171 is connected to an image processing unit 170 for processing a signal converted into an electrical signal by the image sensor 208, the image memory section 3 for storing a processed image, and a dust determination unit 176 for detecting dust and/or dirt on the platen glass 201 from a signal digitized by the image processing unit 170.

Image processing operation will be described next with reference to FIG. 4.

Figure 4:
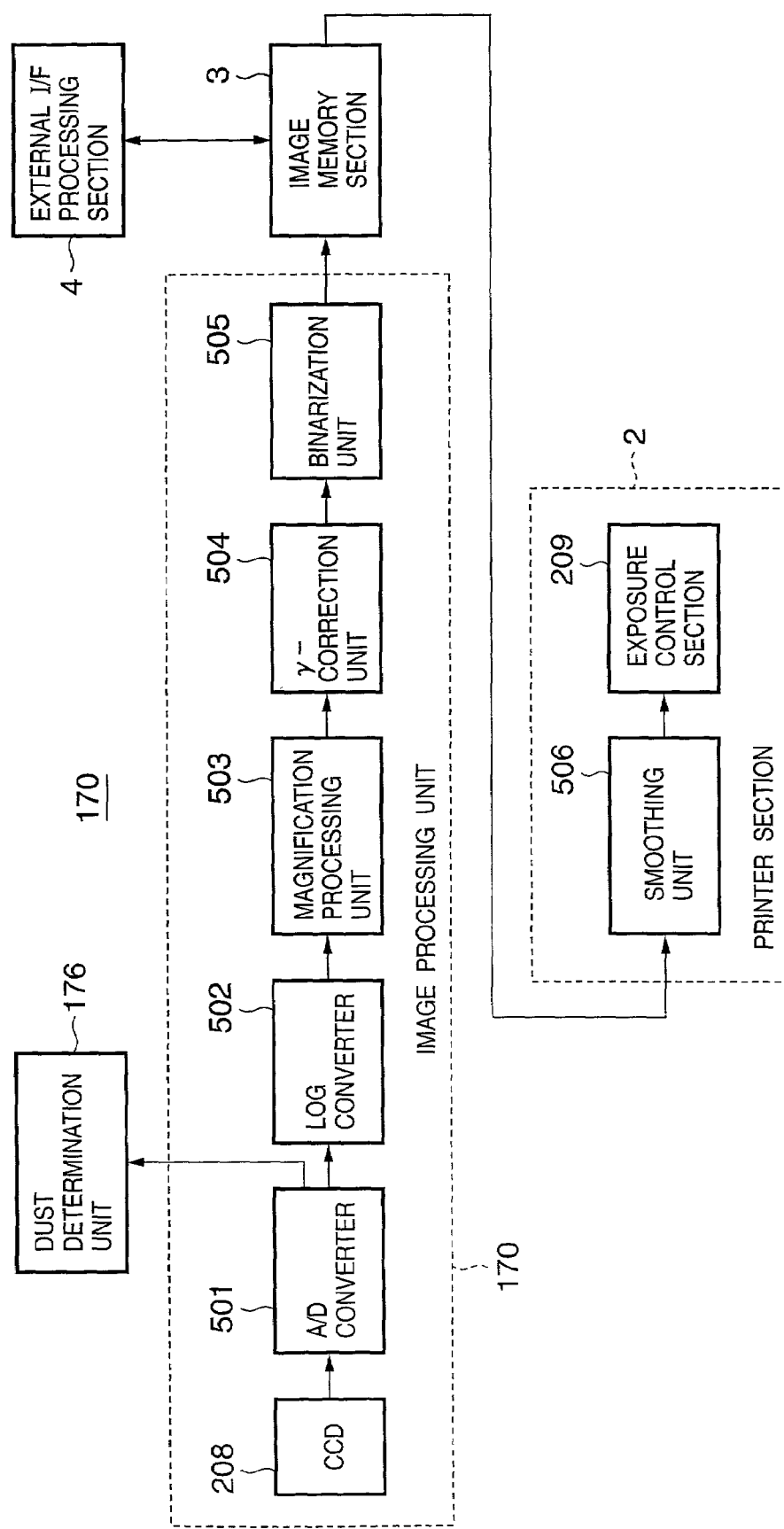
FIG. 4 is a block diagram showing the arrangement of an image processing unit according to the embodiment of the present invention.

FIG. 4 is a block diagram showing the arrangement for image processing. An original image formed on the CCD sensor 208 through the lens 207 is input as luminance data of black and converted into an analog electrical signal by the CCD sensor 208. The converted image information is input to an analog signal processor (not shown), subjected to sample-and-hold and dark level correction, and A/D-converted by an A/D converter 501. The digitized signal is subjected to shading correction (variation in sensor for reading the original and the light distribution characteristic of the original illumination lamp are corrected).

After that, the signal is sent to a log converter 502. The log converter 502 stores an LUT used to convert received luminance data into density data. The luminance data is converted into density data by outputting a table value corresponding to the received data. The image is changed to a desired magnification by a magnification processing unit 503 and input to a γ-correction unit 504. In outputting the density data, the γ-correction unit 504 executes conversion in consideration of the characteristics of the printer and adjusts the output in accordance with the density value set by the operation unit 172.

Then, the data is sent to a binarization unit 505. The multilevel density data is binarized by the binarization unit 505 so that the density value becomes "0" or "255". The 8-bit image data is binarized to 1-bit image data "0" or "1", so the amount of image data stored in the memory becomes small. However, when an image is binarized, the number of grayscale levels of the image decreases from 256 to 2. For this reason, when halftone image data such as a photographed image is binarized, generally, the image greatly degrades. To prevent this, pseudo halftoning using binary data is necessary.

As a pseudo halftoning technique using binary data, an error diffusion method is used. In this method, when the density of an image is larger than a threshold value, the image is defined as density data "255". If the density is equal to or smaller than the threshold value, the image is defined as density data "0". After binarization is executed in this way, the difference between the actual density data and the binary data is distributed to peripheral pixels as an error signal. To distribute an error, an error generated by binarization is multiplied by a weight coefficient on a matrix prepared in advance and added to the peripheral pixels. With this processing, the average density value of the entire image is maintained, and a pseudo-halftone image can be expressed by binary data.

The binarized image data is sent to the image memory section 3 and stored. Image data input from a computer or the like through the external I/F processing section 4 is processed by the external I/F processing section 4 as binary image data and therefore directly sent to the image memory section 3. The image memory section 3 has a high-speed page memory and a large-capacity memory (hard disk) capable of storing image data of a plurality of pages.

Image data of a plurality of pages stored in the hard disk are output in accordance with an editing mode designated by the operation unit 172 of the digital copying machine 199. In, e.g., a sort mode, the read image data of originals fed from the automatic document feeder 6 are sequentially output. The image data of each original, which is temporarily stored, is read out from the hard disk. This operation is repeated a plurality of number of times to output the image data. With this operation, the same function as that of a sorter having a plurality of bins can be realized.

The image data output from the image memory section 3 is sent to a smoothing unit 506 in the printer section 2. The smoothing unit 506 interpolates the data such that the binarized image has smooth line edge portions and outputs the image data to the exposure control section 209. The exposure control section 209 performs the above-described processing to form the image data on a transfer paper sheet.

In a dust detection processing which will be described later, an image formed on the CCD sensor via the lens 207 is read, digitized, undergoes shading correction, then is transferred to the dust detection unit 176, as in the case of an original image.

The dust detection processing unit 176 adds for each pixel input signals in the document feeding direction (sub-scanning direction), and if the sum of the signals of any pixel is less than a predetermined level, the dust detection processing unit 176 determines that dust and/or dirt are present at that pixel.

Figure 5:
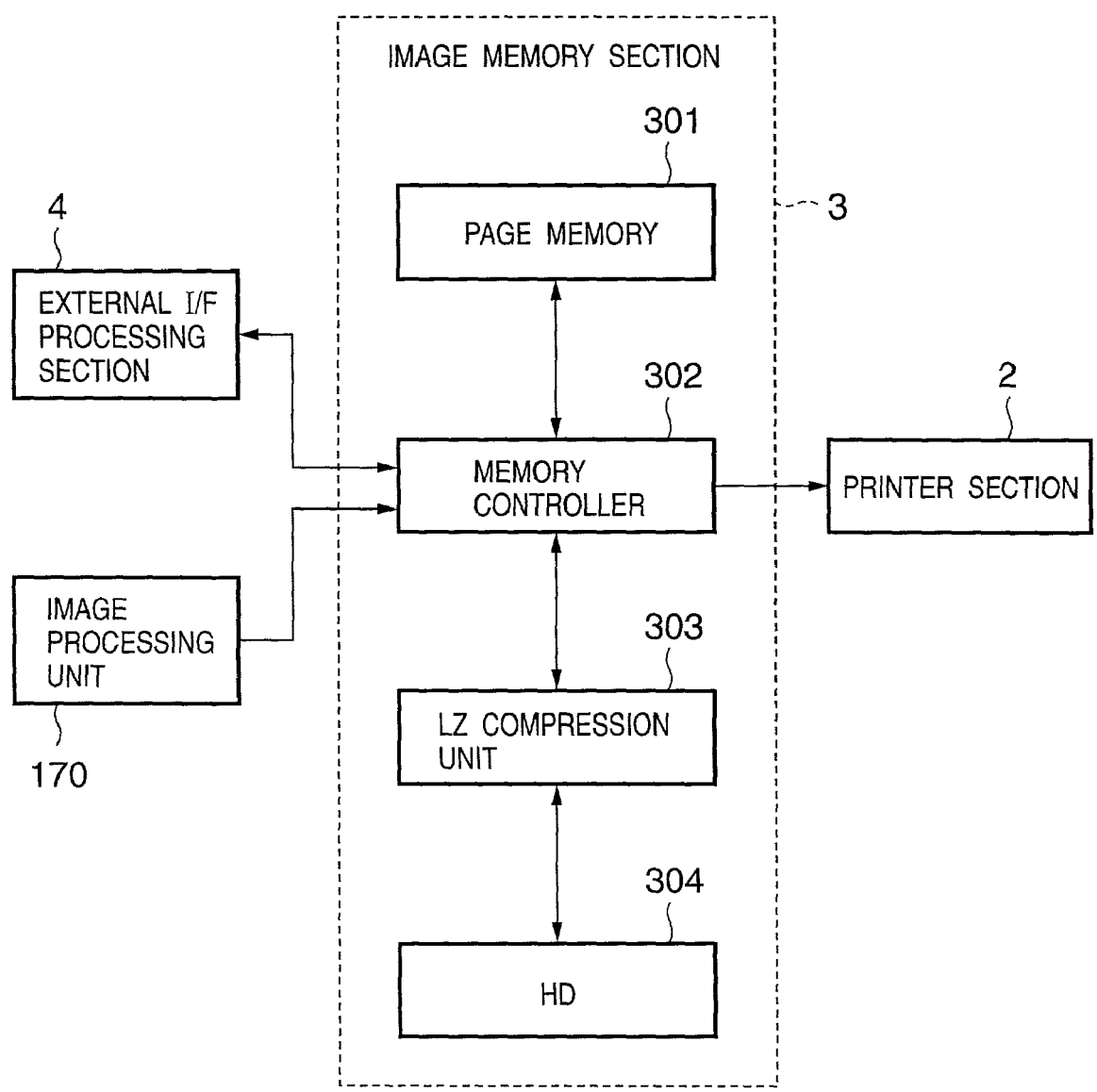
FIG. 5 is a block diagram showing the arrangement of an image memory section according to the embodiment of the present invention.

FIG. 5 is a block diagram showing the arrangement of the image memory section 3. In the image memory section 3, a page memory 301 formed from a memory such as a DRAM is accessed to write a binary image from the external I/F processing section 4 or image processing unit 170, to read out an image to the printer section 2, or input/output an image to/from a hard disk (HD) 304 serving as a large-capacity storage device through a memory controller 302. Reference numeral 303 denotes an LZ (Lempel Ziv) compression unit.

The memory controller 302 generates a DRAM refresh signal for the page memory 301 and also arbitrates access from the external I/F processing section 4, image processing unit 170, and hard disk 304 to the page memory 301. The memory controller 302 also controls the write address to the page memory 301, the read address from the page memory 301, and read direction in accordance with an instruction from the CPU 171. The CPU 171 controls a function of arranging and laying out a plurality of original images in the page memory 301 and outputting them to the printer section 2, a function of extracting and outputting part of an image, or an image rotating function.

Figure 6:
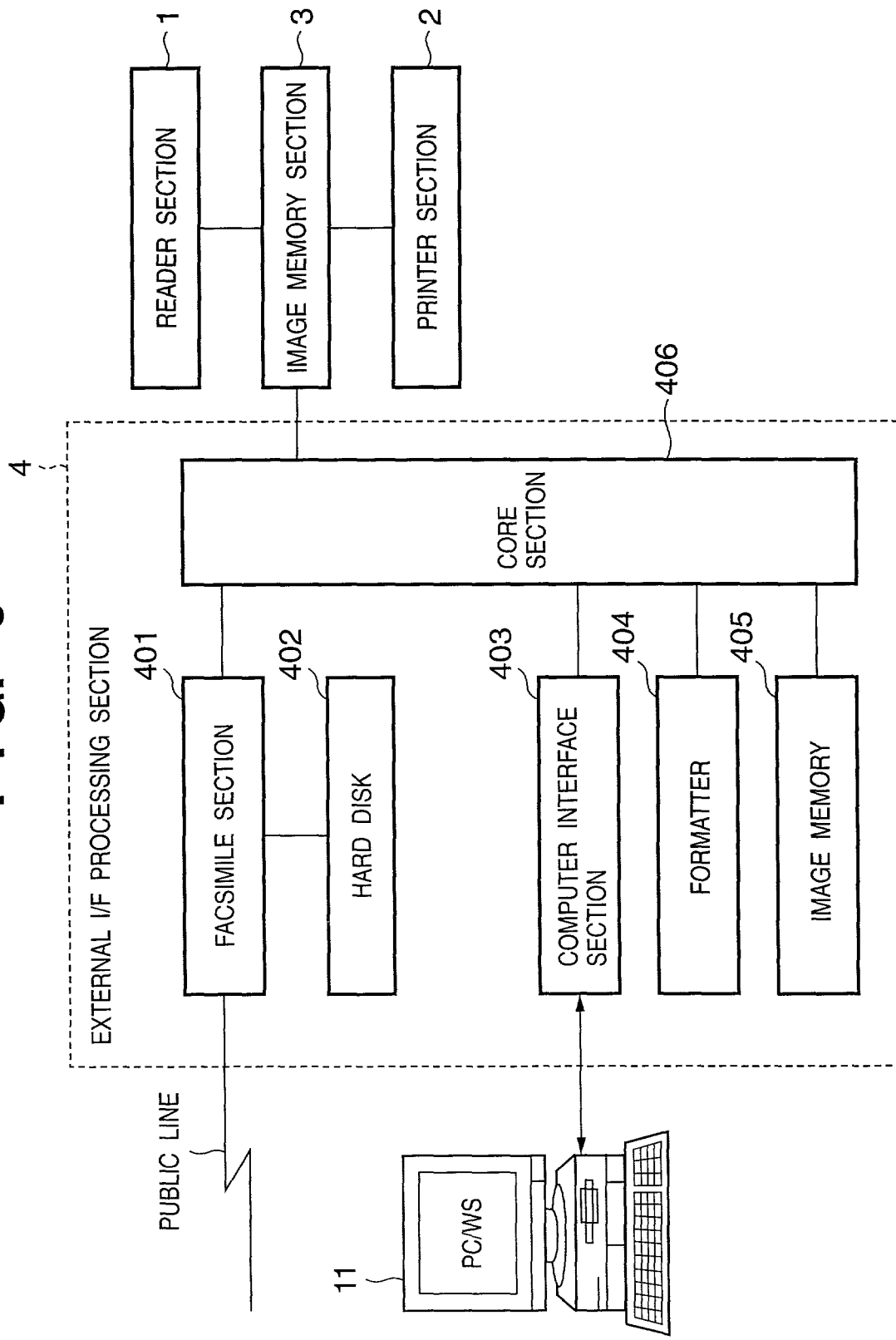
FIG. 6 is a block diagram showing the arrangement of an external I/F processing section according to the embodiment of the present invention.

FIG. 6 is a block diagram showing the arrangement of the external I/F processing section 4. As described above, the external I/F processing section 4 loads binary image data from the reader section 1 through the image memory section 3 or outputs binary image data from the external I/F to the printer section 2 through the image memory section 3 to form an image. The external I/F processing section 4 has a core section 406, a facsimile section 401, a hard disk 402 for storing communication image data of the facsimile section 401, a computer interface section 403 connected to an external computer 11, a formatter 404, and an image memory 405.

The facsimile section 401 is connected to a public line through a modem (not shown) to receive facsimile communication data from the public line and transmit facsimile communication data to the public line. To execute facsimile transmission at a designated time or to transmit image data in accordance with a designated password inquiry from the other party as a facsimile function, the facsimile section 401 stores a facsimile image in the hard disk 402 and processes the image data. With this arrangement, once an image is transferred from the reader section 1 to the facsimile section 401 or hard disk 402 for facsimile through the image memory section 3, facsimile transmission can be executed without using the reader section 1 and image memory section 3 for the facsimile function.

The computer interface section 403 is an interface section for executing data communication with the external computer 11 and has a local area network (to be referred to as a LAN hereinafter), a serial I/F, a SCSI I/F, and a centronics I/F for inputting data to the printer. Through this I/F section, the external computer 11 is notified of the state of the printer section 2 or reader section 1, or an image read by the reader section 1 is transferred to the external computer 11 in accordance with an instruction from the computer. In addition, print image data is received from the external computer 11.

Since print data sent from the external computer 11 through the computer interface section 403 is described in a dedicated printer code, the formatter 404 converts the code into raster image data for image formation by the printer section 2 through the image memory section 3. The formatter 404 rasterizes the raster image data on the image memory 405.

The image memory 405 is used by the formatter 404 to rasterize the raster image data. Alternatively, in sending an image read by the reader section 1 to the external computer 11 through the computer interface section 403 (image scanner function), the image data sent from the image memory section 3 is temporarily rasterized on the image memory 405, converted into a data format to be sent to the external computer 11, and sent from the computer interface section 403.

The core section 406 manages data transfer between the facsimile section 401, computer interface section 403, formatter 404, image memory 405, and image memory section 3. Even when the external I/F processing section 4 has a plurality of image output sections, or even when only a single image transfer path to the image memory section 3 is prepared, exclusive control and priority control are executed to output an image under the management by the core section 406.

The operation of the automatic document feeder of the present invention will be described next with reference to FIGS. 7A to 10B. First, the respective sections of the automatic document feeder will be described with reference to FIG. 7A.

Figure 7A:
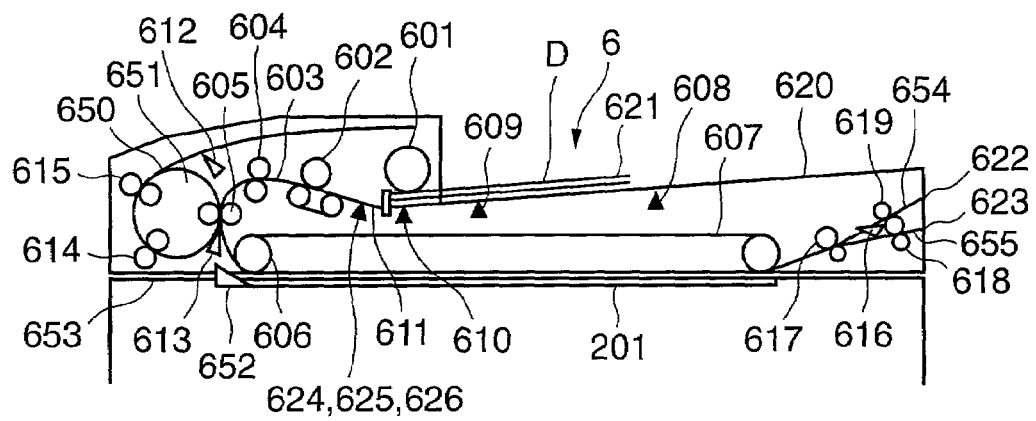
FIGS. 7A to 7D are schematic sectional views of an automatic document feeder according to the embodiment of the present invention for explaining original feeding operation.

A feed roller 601 drops on the original surface of originals 621, including at least one sheet, placed on an original tray 620, and rotates to feed an uppermost original D of the originals. Before the start of feeding of originals, a stopper 611 projects as shown in FIG. 7A, so that the originals 621 are regulated by the stopper 611 and prevented from moving downstream.

Originals fed by the feed roller 601 are separated into one sheet by the function of separation rollers 602 and separation belt 603. This separation is realized by a known retard separation technique. Convey rollers 604 conveys the original separated by the separation rollers 602 and separation belt 603 to registration rollers 605 and makes the original abut against the registration rollers 605 to form a loop, thereby eliminating sheet skews in conveying the original. An inverting feed flapper 613 for guiding the original that has passed between the registration rollers 605 to a feed path 652 serving as a convey path to the platen 201 or an inverting inlet path 653 is arranged under the registration rollers 605.

Both first inverting rollers 614 and second inverting rollers 615 rotate to invert the original. An inverting flapper 612 guides the original from the direction of the second inverting rollers 615 to an inverting path 650 or re-feed path 651. A belt drive roller 606 drives a feed belt 607 for placing the original on the platen. The feed belt 607 abuts against the platen 201. Feed/discharge rollers 617 feed or discharge an original supplied from a manual feed port 622 or discharge the original D feed by the feed belt 607 to an original discharge port 623.

A discharge flapper 616 guides an original to a manual feed/discharge path 654 or original discharge path 655. In discharging an original, the discharge flapper 616 acts to prevent the original from being discharged to the manual feed port 622. A manual feed/discharge roller 619 feeds or discharges a manually fed original. A discharge roller 618 discharges an original. Three sensors 608, 609, and 610 are arranged under the original tray 620.

The original set detection sensor 610 is a transmission-type optical sensor for detecting that the originals 621 has been set. The original trailing-edge detection sensor 608 is a reflection-type optical sensor for determining whether the original is a half-size original. The last original detection sensor 609 arranged between the original set detection sensor 610 and the original trailing-edge detection sensor 608 is a reflection-type optical sensor for determining whether the original that is being conveyed is the last original.

Original size detection sensors 624, 625, and 626 detect the size of the original that is being conveyed. The three sensors are arrayed in the direction of width of the original. The width of the original is detected at three stages on the basis of three sensor values so it can be determined whether the original is of a A size system or a B size system, or the width of the original such as A4 or A5 can be discriminated. Even when the originals contains paper sheets of different sizes, the sizes of the originals can be individually detected. In this case, the originals must be placed while aligning the "deep" edges in the original width direction.

The operation of the automatic document feeder in reading both surfaces of an original (double-sided original) having printed surfaces on both sides will be described next.

Referring to FIGS. 7B to 8D, f indicates the leading edge of an original, and e indicates the trailing edge of the original.

Figure 7B:
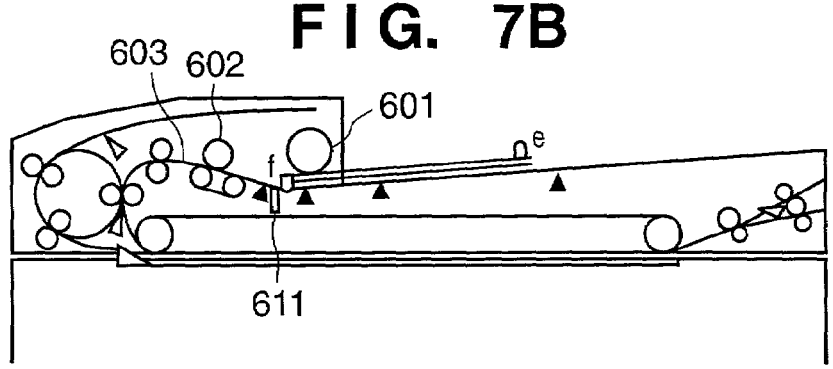
Figure 7C:
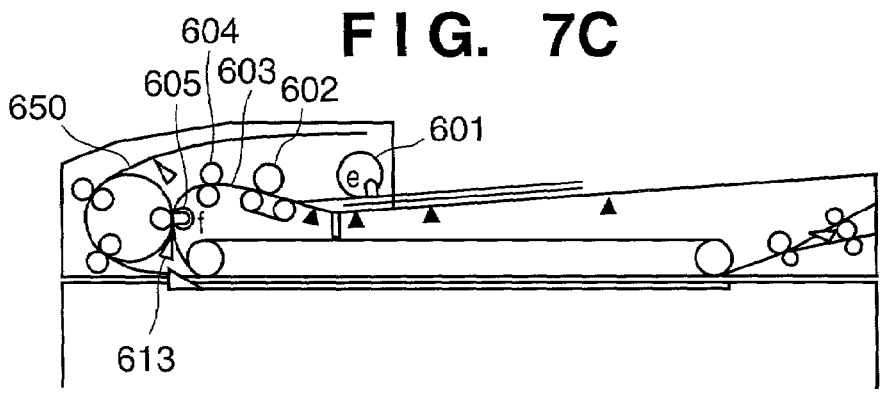

When a double-sided original feed instruction is issued to the automatic document feeder 6, the stopper 611 moves downward, and the feed roller 601 drops onto originals (FIG. 7B). Only the uppermost original is separated from the rest of originals 621 by the functions of the feed roller 601, separation rollers 602, separation belt 603, and convey rollers 604 and fed to the registration rollers 605 (FIG. 7C). At this time, the inverting feed flapper 613 is set in a direction to convey the original to the inverting path 650.

Figure 7D:
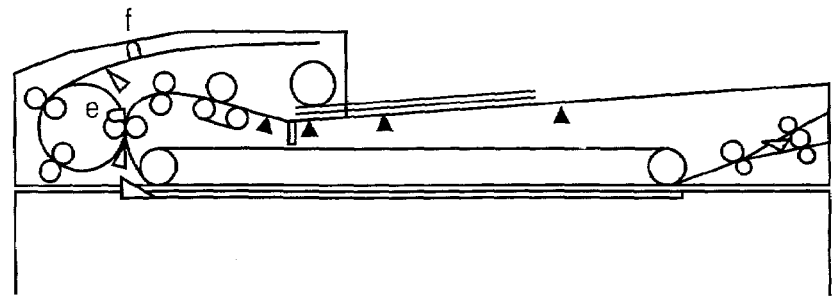
Figure 8A:
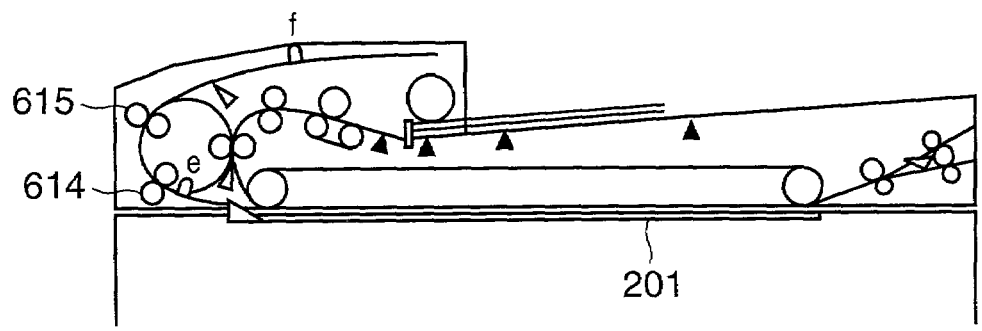
FIGS. 8A to 8D are schematic sectional views of the automatic document feeder according to the embodiment of the present invention for explaining original feeding operation.
Figure 8B:
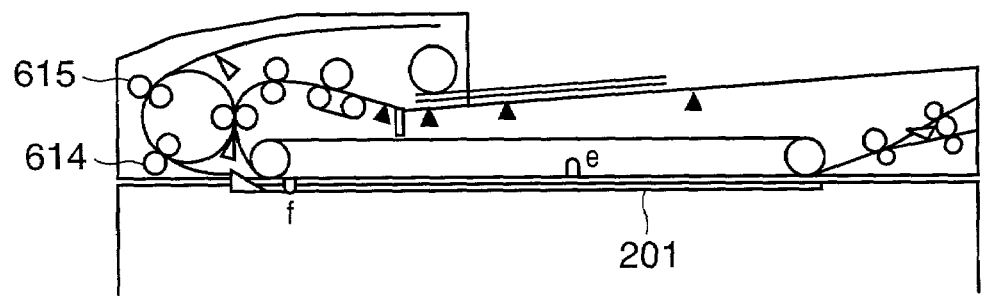
Figure 8C:
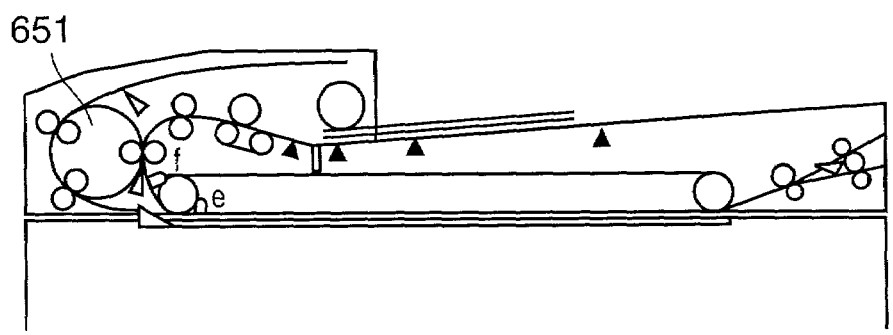
Figure 8D:
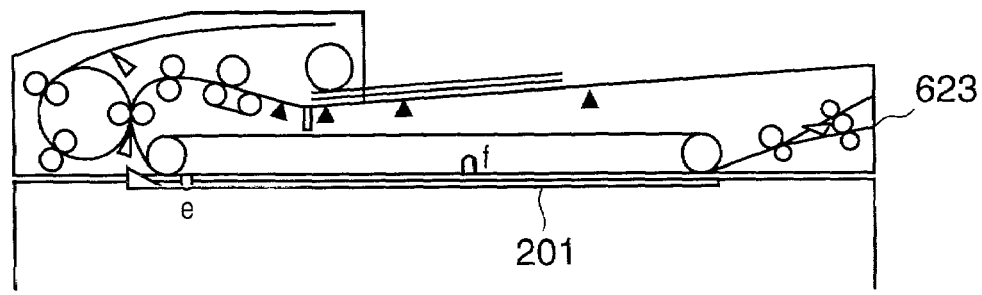

When the registration rollers 605 rotate, the original is conveyed to the position shown in FIG. 8A through the path shown in FIG. 7D. At this time, the drive directions of the first inverting rollers 614 and second inverting rollers 615 are reversed. The original is fed onto the platen 201 and stops at the position shown in FIG. 8B. When reading of the original is ended, the original is turned through the re-feed path 651, as shown in FIG. 8C, and fed onto the platen 201 again, as shown in FIG. 8D.

When reading of the original is ended, the original is fed to the right and discharged from the automatic document feeder 6 through the original discharge port 623. By repeating the above operation, the automatic document feeder 6 can separate double-sided originals one by one from the uppermost original, read both surfaces, and discharge the original while facing the upper surface down.

Next, the operation of original reading scheme (flow scanning) in which the scanner 202 is fixed at a predetermined position, and an image is read while moving an original (read-while-feed operation) will be described for both a case wherein originals contains only small-size originals and a case wherein originals contains a large-size original. In this embodiment, a small-size original means an original that is not detected by the original trailing-edge detection sensor 608 when the originals 621 are placed on the original tray 620, e.g., A4 size or letter size. A large-size original means an original that is detected by the original trailing-edge detection sensor 608 when the originals 621 is placed on the original tray 620, e.g., A3 size or 11×17 size.

In performing a read-while-feed operation using the automatic document feeder 6, reading position is changed in accordance with the size of the original so that the fed original can be read in a stable state. The changeover of the reading positions is performed on the basis of the detected result by the sensor 608. Alternatively, a user may set a reading mode and the reading positions are changed in accordance with the set reading mode.

A read-while-feed operation of small-size originals will be described below.

Figure 9A:
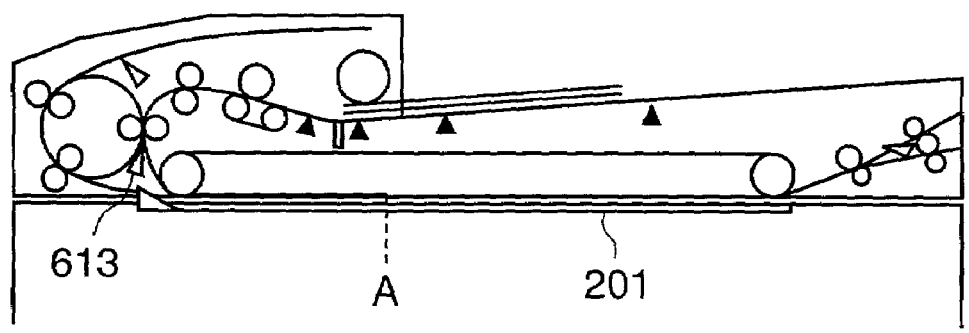
FIGS. 9A to 9C are schematic sectional views of the automatic document feeder according to the embodiment of the present invention for explaining original feeding operation.
Figure 9B:
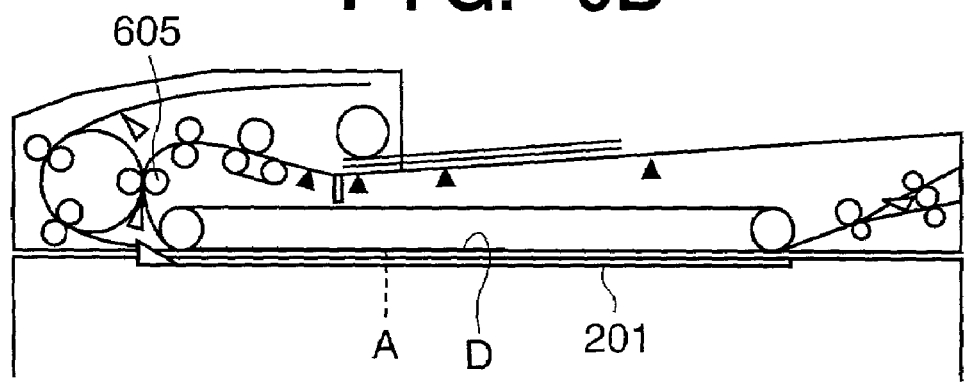

The operation until an original reaches the registration rollers 605 is the same as that described with reference to FIGS. 7A to 7C. In the read-while-feed operation, the original is further guided onto the platen 201 by the inverting feed flapper 613, as shown in FIG. 9A. The original is conveyed on a position A in FIG. 9A at a predetermined speed. The image of the original is read by the scanner 202 which is standing by under the position A (FIG. 9B). At this time, at the timing when the leading edge of the original passes through the position A, a reading start signal is sent to the reader section 1.

Figure 9C:
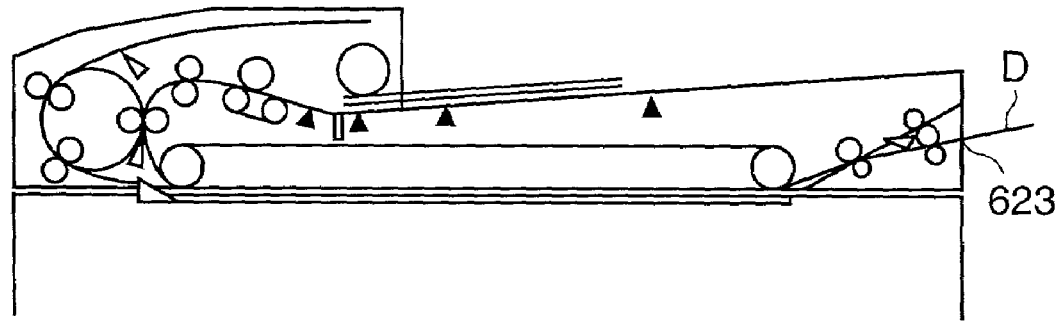

The read original is conveyed to the right in FIG. 9B and discharged from the automatic document feeder 6 through the original discharge port 623 (FIG. 9C). The position A is formed from six sub-positions A0, A1, A2, A3, A4, and A5 in this embodiment. A position at which the trailing edge of an original of letter size passes through the registration rollers 605 is defined as A0, and A1, A2, ... are defined in 0.5-mm increments from the position A0 to the right. A readable position determined by dust determination (to be described later) is stored, and in the reading mode, the scanner 202 and automatic document feeder 6 are instructed to execute reading at the stored position.

Figure 10A:
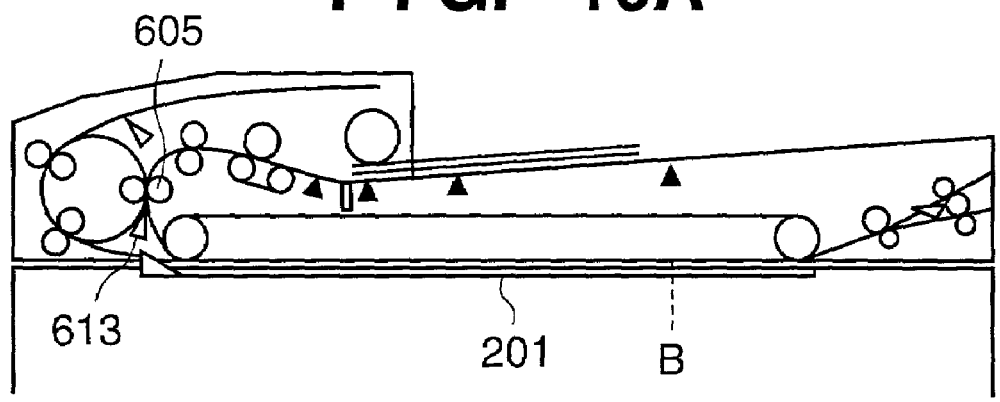
FIGS. 10A and 10B are schematic sectional views of the automatic document feeder according to the embodiment of the present invention for explaining original feeding operation.

A read-while-feed operation of originals including a large-size original or originals will be described next. The operation until an original reaches the registration rollers 605 is the same as that described with reference to FIGS. 7A to 7C. In the read-while-feed operation of the originals containing a large-size original or originals, the original is further guided onto the platen 201 by the inverting feed flapper 613, as shown in FIG. 10A. The original is conveyed over a position B in FIG. 10A at a predetermined speed. The image of the original is read by the scanner 202 which is standing by under the position B. At this time, at the timing when the leading edge of the original passes through the position B, a reading start signal is sent to the reader section 1. Note, the position B is in the downstream of the position A in the sub-scanning direction.

Figure 10B:
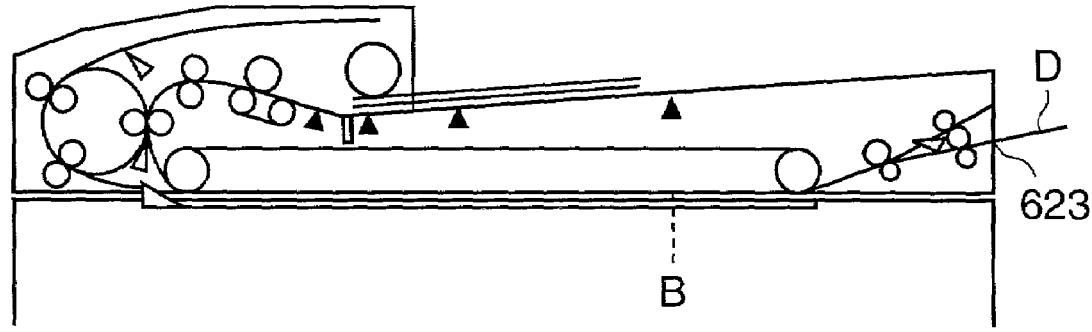

The read original is conveyed to the right of the FIG. 10A and discharged from the automatic document feeder 6 through the original discharge port 623 (FIG. 10B). The position B is formed from six sub-positions B0, B1, B2, B3, B4, and B5. A position at which the trailing edge of a 11×17 original passes through the registration rollers 605 is defined as B0, and B1, B2, ... are defined in 0.5-mm increments from the position B0 to the right. A readable position determined by dust determination (to be described later) is stored, and in the reading mode, the scanner 202 and automatic document feeder 6 are instructed to execute reading at the stored position.

In the stationary reading operation in which an image is read by moving the scanner 202, an original is placed at a position (position shown in FIG. 8D) at which the trailing edge of the original matches the end portion of the platen 201.

FIG. 11 is a view showing the direction of originals discharged from the original discharge port. FIG. 11 shows the correlation between the direction of the originals 621 set on the original tray 620 of the automatic document feeder 6 (FIG. 7A) and the direction of the originals 621 conveyed and discharged to the original discharge port 623. The originals shown on the left side of FIG. 11 is the originals 621 set on the original tray 620. The originals are sequentially conveyed from the uppermost original 1, inverted, and output. For this reason, the discharged originals are faced down and the lowermost original on the original tray 620 is on the top of the originals, as shown on the right side of FIG. 11.

A control example when an automatic magnification function of calculating an optimum magnification factor on the basis of the original size and output paper size is set in the image reading apparatus having the above arrangement will be described.

When the automatic magnification function is set, and the originals placed on the automatic document feeder are of a single size, the first original of the bundle is fed onto the platen. The original size is detected during feeding, and the original image is read by a stationary reading operation. From the second original, the original images are read by a read-while feed operation while conveyance of originals by the automatic document feeder. However, if a read-while feed operation is impossible at that magnification factor, the original image is read by the stationary reading operation.

When the originals placed on the automatic document feeder contains an original or originals having different sizes (mixed original loading mode), the magnification factor must be calculated for each original. Hence, original images are read by the stationary reading operation until the last original.

Figure 12:
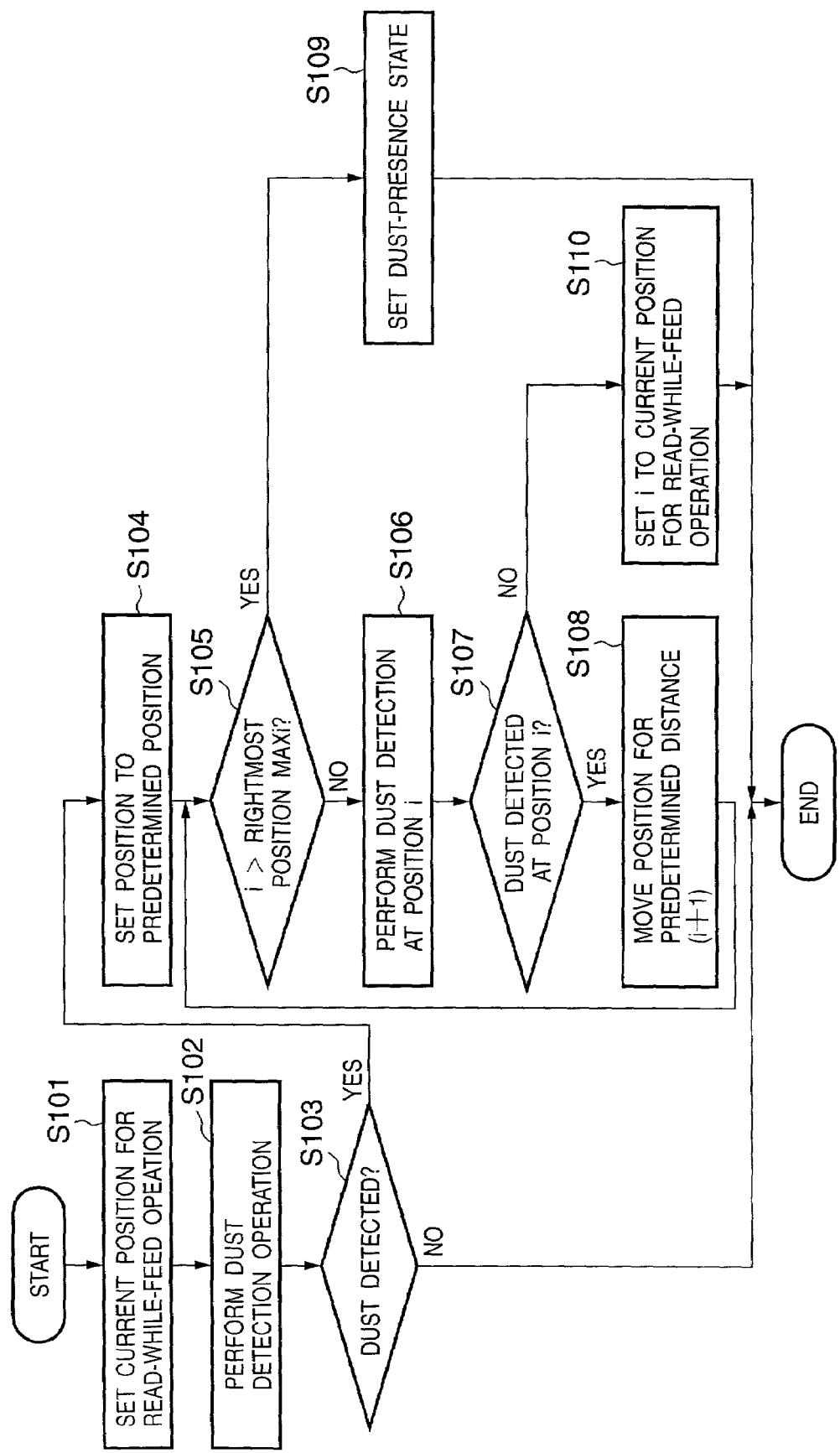
FIG. 12 is a flow chart for briefly explaining dust detection processing according to the embodiment of the present invention.

FIG. 12 is a flow chart showing the basic operation related to the dust detection processing.

When a read-while-feed operation is performed using the document feeding operation of the automatic document feeder 6, a time when no reading operation of an original is carried out is used. An image is read while moving a feed belt 607 of an automatic document feeder 6 without feeding any original at the current reading position (steps S101 and S102).

The image signals read out in the aforesaid manner represent an image of the surface of the feed belt 607. Thus, detection of dust and/or dirt is performed using these image signals (step S102). When dust and/or dirt stick to the platen glass 201, an image continuous in the sub-scanning direction is detected in the read image signal.

After the image of the feed belt 607 is read by driving the feed belt 607 for a predetermined period, if an aforesaid image which is considered as the resultant image of dust and/or dirt (YES in step S103), it is determined that the read-while-feed operation should not be performed at this reading position. Whereas, if no such abnormal image is detected (NO in step S103), it is determined to perform the read-while-feed operation at this reading position, and the process ends.

When dust or dirt of the platen glass 201 is detected at the current position (YES in step S103), the position is moved to a predetermined position to search a position where the read-while-feed operation is possible. The scanner 202 is moved from that position in a predetermined direction by a predetermined distance, thereby sequentially searching for a position where the read-while-feed operation is possible. For example, when the reading position for the read-while-feed operation is the position A described with reference to FIGS. 9A to 9C, the scanner 202 is moved leftward to the position A0. After that, the scanner 202 is moved from the position A0 to A1, A2, ... to search for a position where flow scanning is possible.

First, the scanning position is moved to a predetermined position (step S104), and that position is defined as the next candidate position (i) where the read-while-feed operation can be performed. It is determined in step S105 whether the position (i) for the read-while-feed operation is beyond the right most position MAXi. If NO in step S105, the above-described image reading operation for dust detection (move feed belt without feeding any original, read image, and analyze image) is performed, to detect whether the read-while-feed operation can be executed at that position (whether dust is present) (step S106).

Next in step S107, whether or not dust or dirt presents is determined. If YES in step S107, the reading position is shift to right to (i+1) in step S108. Thereafter, the flow returns to step S105 and the aforesaid processing is repeated.

If it is determined that no dust or dirt presents at the position (i) (NO in step S107), the position (i) is set as the reading position for the next read-while-feed operation (step S110).

Whereas, if YES in step S105 (i.e., dust or dirt is detected at every position), the process proceeds to step S109 where the state of the platen glass 201 is set to a dust-presence state. In this embodiment, until it is determined by predetermined processing (to be described later) that the readwhile-feed operation is possible, the reading operation by the read-while-feed operation is not performed.

A control example for determining whether a read-while-feed operation is to be executed on the basis of the result of dust detection operation using a read-while-feed inhibition flag, and notifying the user of the presence of dust or dirt in the image reading apparatus having the above arrangement will be described.

Figure 13:
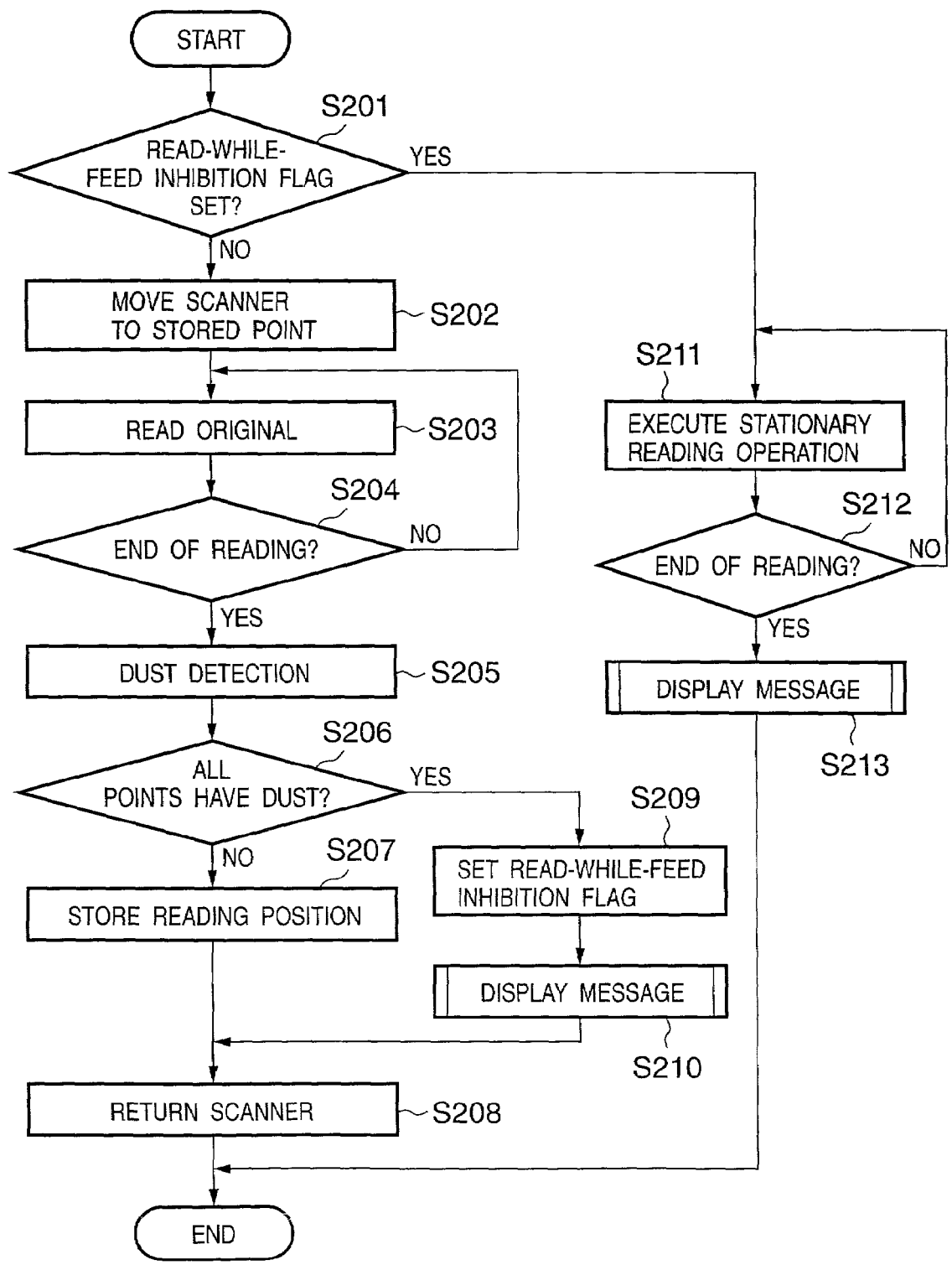
FIG. 13 is a flow chart showing a procedure of dust detection processing according to a first embodiment of the present invention.

FIG. 13 is a flow chart showing the control method. This control starts when a dust-presence message is not displayed, originals are set, and a mode in which reading is executed by the read-while-feed operation is set.

First, in step S201, it is determined whether the read-while-feed inhibition flag is set. If NO in step S201, the read-while-feed operation can be executed, hence, the flow advances to step S202 to move the scanner 202 to a position that is stored as a reading position. Thereafter, the flow advances to step S203 to feed the uppermost original, and reading processing by the read-while-feed operation is executed. The flow advances to step S204 to determine whether the fed original is the last original and the reading processing is ended. If NO in step S204, the flow returns to step S203 to continue the reading processing.

If YES in step S204, the flow advances to step S205 to execute the dust detection operation. Thereafter, the flow advances to step S206 to determine whether all positions have dust or dirt as a result of dust detection in step S205. If any one of the positions has no dust or dirt, the flow advances to step S207 to store the position without any dust or dirt as the position to be used in the subsequent read-while-feed operation. Then, the flow advances to step S208 to move the scanner 202 to a predetermined standby position, and the processing is ended.

If it is determined in step S206 that all the positions have dust, the flow advances to step S209 to set the read-while-feed inhibition flag. Then, the flow advances to step S210 to notify a message as shown in FIG. 16 by display or sound to prompt the user to clean the platen glass 201, and the flow advances to step S208.

If YES in step S201, it means that the message is cleared without cleaning the platen glass 201. Hence, the original cannot be properly read in the read-while-feed operation. Therefore, the reading method is switched to a stationary reading operation capable of reading the original with less influence of dust and/or dirt. The flow advances to step S211 to execute reading processing in the stationary reading operation. Then, the flow advances to step S212 to determine whether the fed original is the last original and the reading processing is ended.

If NO in step S212, the flow returns to step S211 to continue the reading processing. If YES in step S212, the flow advances to step S213 to notify the message as shown in FIG. 16 by display and/or sound to prompt the user to clean the platen glass 201. After that, the processing is ended. A control example when a message is to be displayed when the read-while-feed inhibition flag is set after the end of the reading operation has been described above.

Next, two control examples of message display processing performed in steps S210 and S213 shown in FIG. 13 will be explained with reference to FIGS. 14 and 15.

Figure 14:
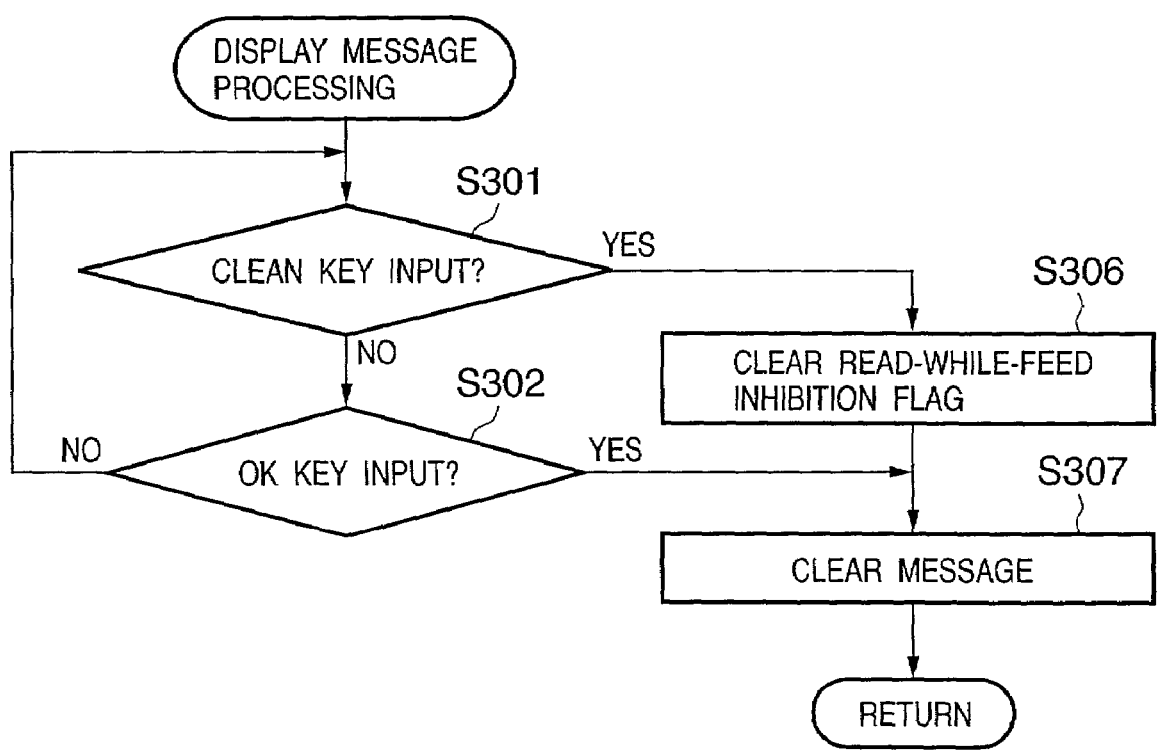
FIG. 14 is a flow chart showing a procedure of recovering from an alarm state shown in FIG. 13.

FIG. 14 is a flowchart showing an example of control method when the message is cleared in response to user's key input performed in steps S210 and S213. This processing starts when the dust-presence message is displayed after the end of the reading operation.

First, it is determined in step S301 whether a clean key is input. If NO in step S301, the flow advances to step S302 to determine whether an OK key is input. If NO in step S302, the flow returns to step S301 to repeat the above processing.

If YES in step S301, it is determined that cleaning has been done. Thus, the flow advances to step S306 to clear the read-while-feed inhibition flag. After that, the flow advances to step S307 to clear the message, and the processing is ended.

If YES in step S302, it is determined that cleaning is not executed. Thus, the flow advances to step S307 to clear the message without clearing the read-while-feed inhibition flag, and the processing is ended. When the reading operation is performed, the message is displayed again after the end of reading, as described with reference to FIG. 13.

Figure 15:
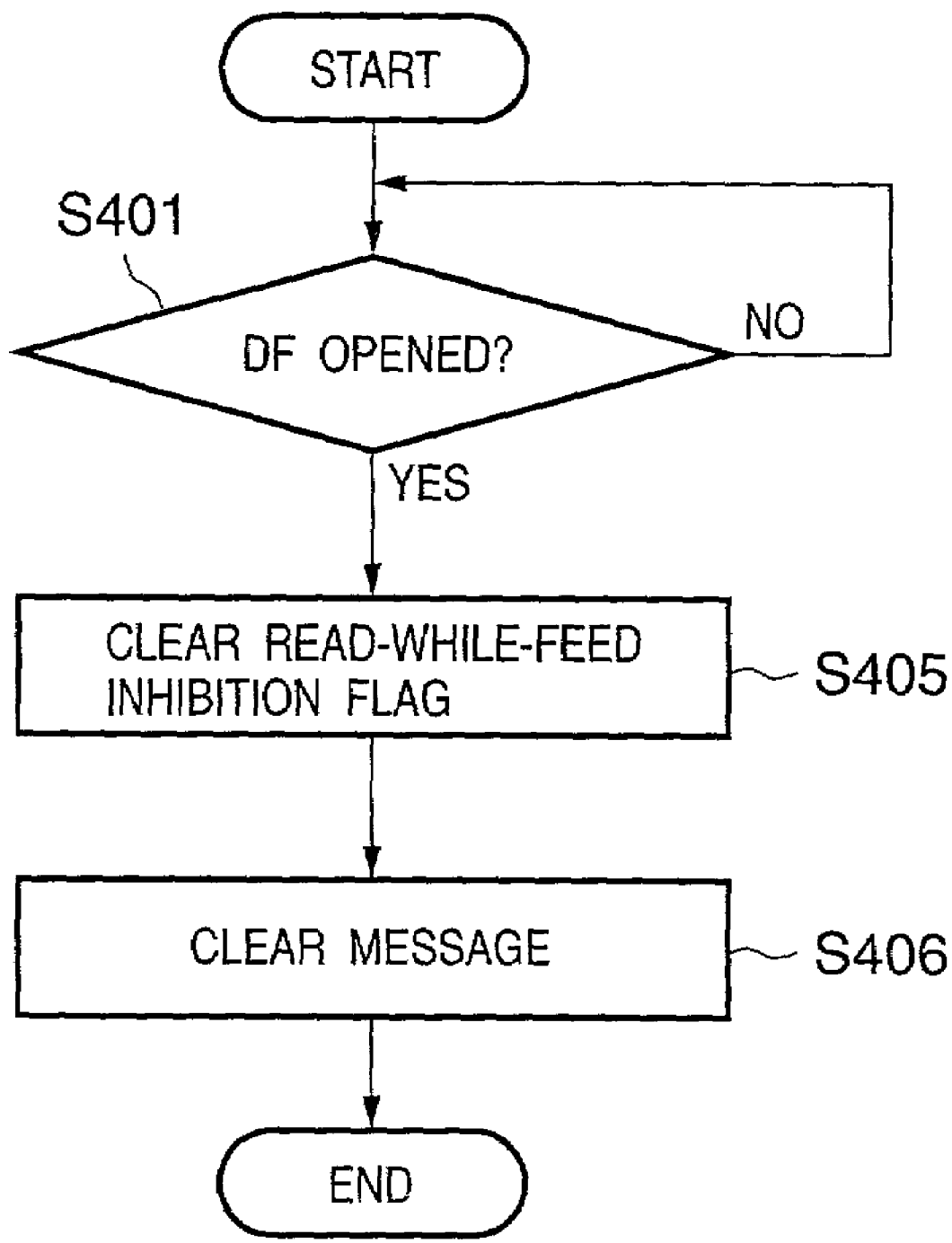
FIG. 15 is a flow chart showing another procedure of recovering from the alarm state shown in FIG. 13.

FIG. 15 is a flowchart showing an example of control method, performed in steps S210 and S213 in FIG. 13, for automatically deciding whether or not to clear the message in accordance with a state of the automatic document feeder 6. This processing starts when the dust-presence message is displayed after the end of the reading operation.

First in step S401, whether the automatic document feeder 6 is opened or not is determined. If the automatic document feeder 6 is not opened, the flow returns to step S401.

Whereas, if YES in step S401, it is assumed that the platen glass 201 is cleaned. In this case, the flow advances to step S405 where the read-while-feed inhibition flag is cleared.

Thereafter, the flow advances to step S406 to clear the dust-presence message and the processing is ended. The above control is an example of automatically deciding clearing of the message based on the state of the automatic document feeder 6.

As described above, after it is confirmed that the user cleaned the platen glass 201 by an input from the operation unit 172, the read-while-feed operation is allowed in the subsequent processing. Alternatively, after the automatic document feeder is opened and it is decided that the platen glass 201 is cleaned by the user, the read-while-feed operation is allowed in the subsequent processing.

According to the first embodiment as described above, the read-while-feed inhibition flag which is turned ON when dust and/or dirt is detected at all the predetermined reading positions is used, and when a read-while-feed operation is improper, a cleaning operation is prompted to a user, the read-while-feed operation is inhibited until the cleaning operation is performed, and reading is performed in a stationary reading operation capable of reading an original with less influence of dust and/or dirt.

Further, if the read-while-feed operation is possible at any one of the predetermined reading positions, such a position is automatically detected. Thus, when there is no dust or dirt on the platen glass, or when it is possible to avoid the influence of the dust and/or dirt on the platen glass, the read-while-feed operation is performed to achieve the fast document reading operation while avoiding a problem in which a read image has black lines due to the dust and/or dirt on the platen glass. Accordingly, productivity of the reading operation can be improved.

<Second Embodiment>

Next, the second embodiment of the present invention will be explained.

An image reading apparatus and dust detection processing according to the second embodiment are the same as those described in the first embodiment with reference to FIGS. 1 to 12, and thus the explanation of them is omitted.

In an image reading apparatus, having the aforesaid configuration, which determines whether or not to perform the read-while-feed operation on the basis of the dust detection operation and notifies a user of presence of dust and/or dirt if dust and/or dirt are detected, an operation example of performing a dust detection operation after a read-while-feed operation will be explained. In the second embodiment, a control example using a flag indicative of whether or not to perform the dust detection operation (referred to as "dust detection flag", hereinafter) is explained. Note, on/off of the dust detection flag can be set by the user from the operation unit 172.

Figure 17:
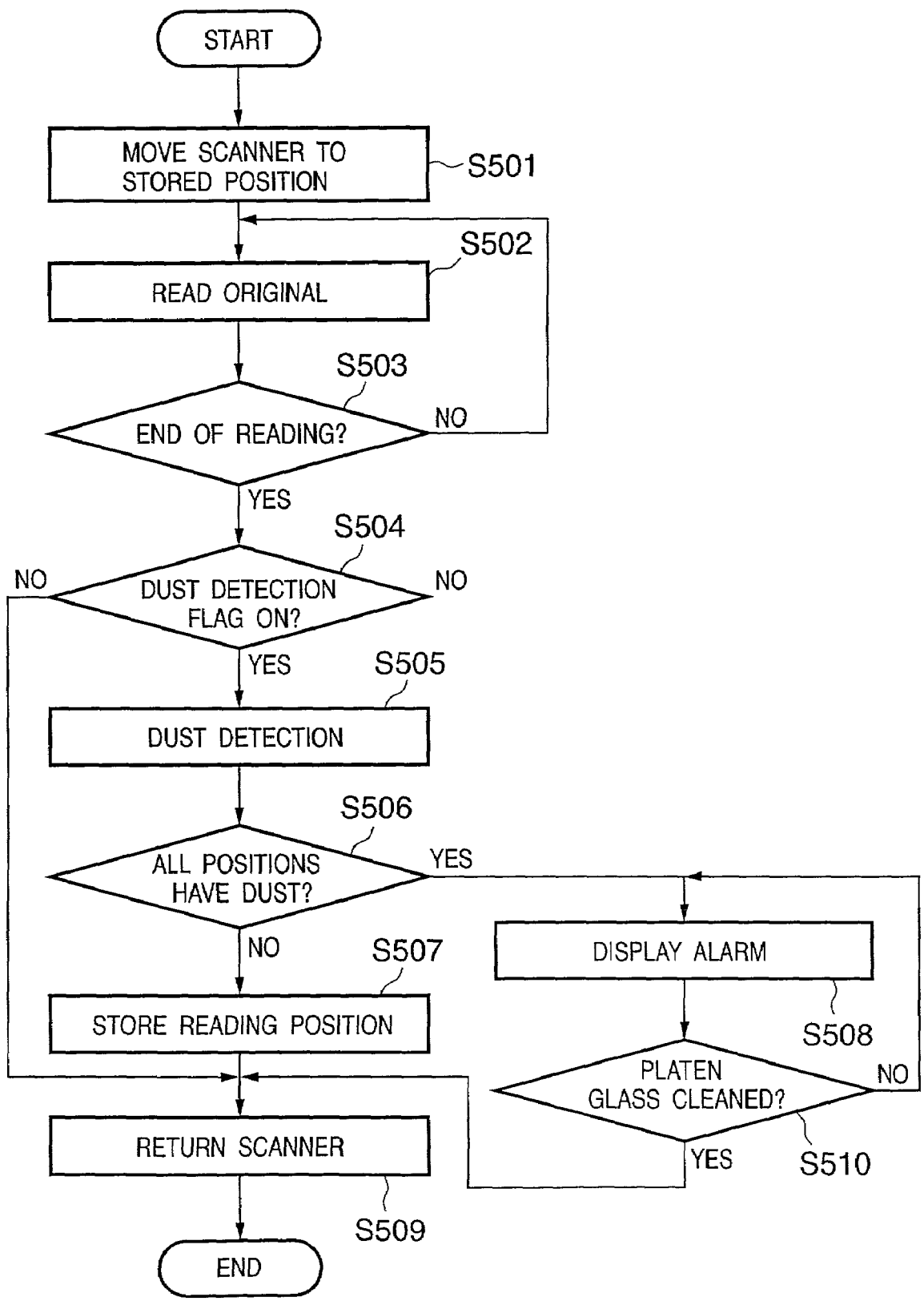
FIG. 17 is a flow chart of a control method when a flag indicative of whether or not to perform dust detection processing is used according to a second embodiment of the present invention.

FIG. 17 is a flow chart showing the control method. This processing starts when an original or originals are set and a mode in which reading is to be performed by a read-while-feed operation is set.

First, in step S501, a scanner 202 is moved to a position stored as a reading position. Thereafter, the flow advances to step S502 to feed the uppermost original, and reading processing by the read-while-feed operation is executed. The flow advances to step S503 to determine whether the fed original is the last original and the reading processing is ended. If NO in step S503, the flow returns to step S502 to continue the reading processing.

If YES in step S503, the flow advances to step S504 to determine whether a dust detection flag is set. If NO in step S504, the flow directly advances to step S509, the scanner 202 is moved to a predetermined standby position, and the processing is ended. Whereas, if it is determined that the dust detection flag is set in step S504, then the flow advances to step S505 to perform a dust detection operation.

Thereafter in step S506, it is determined whether all the predetermined reading positions have dust or dirt as a result of dust detection in step S505. If any one of the positions has no dust or dirt, the flow advances to step S507 to store the position without any dust or dirt as the position to be used in the subsequent read-while-feed operation. Then, the flow advances to step S509 to move the scanner 202 to a predetermined standby position, and the processing is ended.

If it is determined in step S506 that all the positions have dust and/or dirt, the flow advances to step S508 to alarm that the read-while-feed operation can not be performed in the operation unit 172 or to notify a message as shown in FIG. 16 by display or sound to prompt the user to clean the platen glass 201. In step S510, whether or not the cleaning of the platen glass 201 is performed is determined, and the alarm is continued until the cleaning is performed (i.e., until YES in step S510).

As described above, whether or not to perform the dust detection operation after the read-while-feed operation is controlled by using a flag indicative of whether or not to perform the dust detection operation. As a result of the dust detection, if the read-while-feed operation is determined possible at any one of the predetermined reading positions, such a position is automatically detected.

Thus, when there is no dust or dirt on the platen glass, or when it is possible to avoid the influence of the dust and/or dirt on the platen glass, the read-while-feed operation is performed to achieve the fast document reading operation while avoiding a problem in which a read image has black lines due to the dust and/or dirt on the platen glass. Accordingly, productivity of the reading operation can be improved.

<Third Embodiment>

Next, the third embodiment of the present invention will be explained.

An image reading apparatus and dust detection processing according to the third embodiment are the same as those described in the first embodiment with reference to FIGS. 1 to 12, and thus the explanation of them is omitted.

Figure 18:
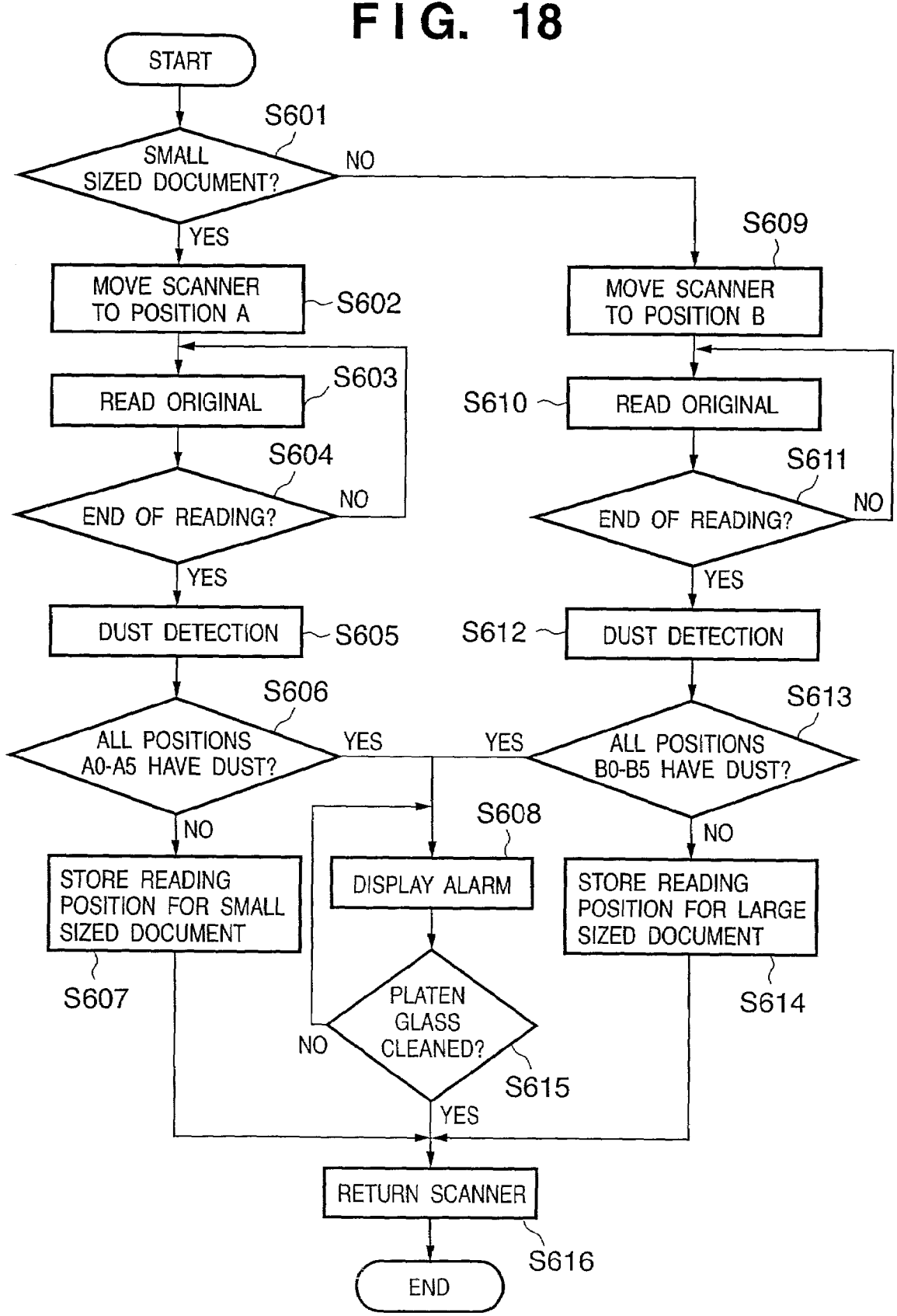
FIG. 18 is a flow chart of a control method when a dust detection processing is performed at a position depending upon the size of an original according to a third embodiment of the present invention.

FIG. 18 is a flow chart showing the control method of the image reading apparatus according to the third embodiment. This processing starts when an original or originals are set and a mode in which reading is to be performed by a read-while-feed operation is set.

First in step S601, whether an original or originals set on an automatic document feeder 6 are small size or not is determined. If the set original or originals are small size, the flow advances to step S602 to move a scanner 202 to a position A (one of the positions A0 to A5) which is stored as a reading position for a small sized original.

Thereafter, the flow advances to step S603 to feed the uppermost original, and reading processing by the read-while-feed operation is executed. The flow advances to step S604 to determine whether the fed original is the last original and the reading processing is ended.

If NO in step S604, the flow returns to step S603 to continue the reading processing. If YES in step S604, the flow advances to step S605 to execute the dust detection operation.

Thereafter, the flow advances to step S606, where it is determined whether all positions A0 to A5 have dust or dirt as a result of dust detection in step S605. If any one of the positions A0 to A5 has no dust or dirt, the flow advances to step S607 to store the position having no dust or dirt as the position to be used in the subsequent read-while-feed operation for a small sized original. Then, the flow advances to step S616 to move the scanner 202 to a predetermined standby position, and the processing is ended.

If it is determined in step S606 that all the positions A0 to A5 have dust and/or dirt, the flow advances to step S608 to alarm that the read-while-feed operation can not be performed in the operation unit 172 or to notify a message as shown in FIG. 16 by display or sound to prompt the user to clean the platen glass 201. In step S615, whether or not the cleaning of the platen glass 201 is performed is determined, and the alarm is continued until the cleaning is performed (i.e., until YES in step S615).

Whereas, if it is determined in step S601 that the original or originals set on the automatic document feeder 6 are not small size, the flow advances to step S609, where the scanner 202 is moved to a position B (one of the positions B0 to B5) which is stored as a reading position for a large sized original. Thereafter, the processes in steps S610 to S612 are performed in the similar manner as those for the small size original, the flow advances to step S613.

In step S613, it is determined whether all the positions B0 to B5 have d-dust or dirt as a result of dust detection in step S612. If any one of the positions B0 to B5 has no dust or dirt, the flow advances to step S614 to store the position having no dust or dirt as the position to be used in the subsequent read-while-feed operation for a large sized original. Then, the flow advances to step S616 to move the scanner 202 to a predetermined standby position, and the processing is ended.

If it is determined in step S613 that all the positions B0 to B5 have dust and/or dirt, the flow advances to step S608 to alarm that the read-while-feed operation can not be performed in the operation unit 172 or to notify a message as shown in FIG. 16 by display or sound to prompt the user to clean the platen glass 201. In step S615, whether or not the cleaning of the platen glass 201 is performed is determined, and the alarm is continued until the cleaning is performed (i.e., until YES in step S615).

According to the third embodiment as described above, dust detection is performed at a reading position in correspondence with the size of an original. And if the readwhile-feed operation is possible at any one of the predetermined reading positions, such a position is automatically detected.

Thus, when there is no dust or dirt on the platen glass, or when it is possible to avoid the influence of the dust and/or dirt on the platen glass, the read-while-feed operation is performed to achieve the fast document reading operation while avoiding a problem in which a read image has black lines due to the dust and/or dirt on the platen glass. Accordingly, productivity of the reading operation can be improved.

<Fourth Embodiment>

Next, the fourth embodiment of the present invention will be explained.

An image reading apparatus and dust detection processing according to the fourth embodiment are the same as those described in the first embodiment with reference to FIGS. 1 to 12, and thus the explanation of them is omitted.

Figure 19:
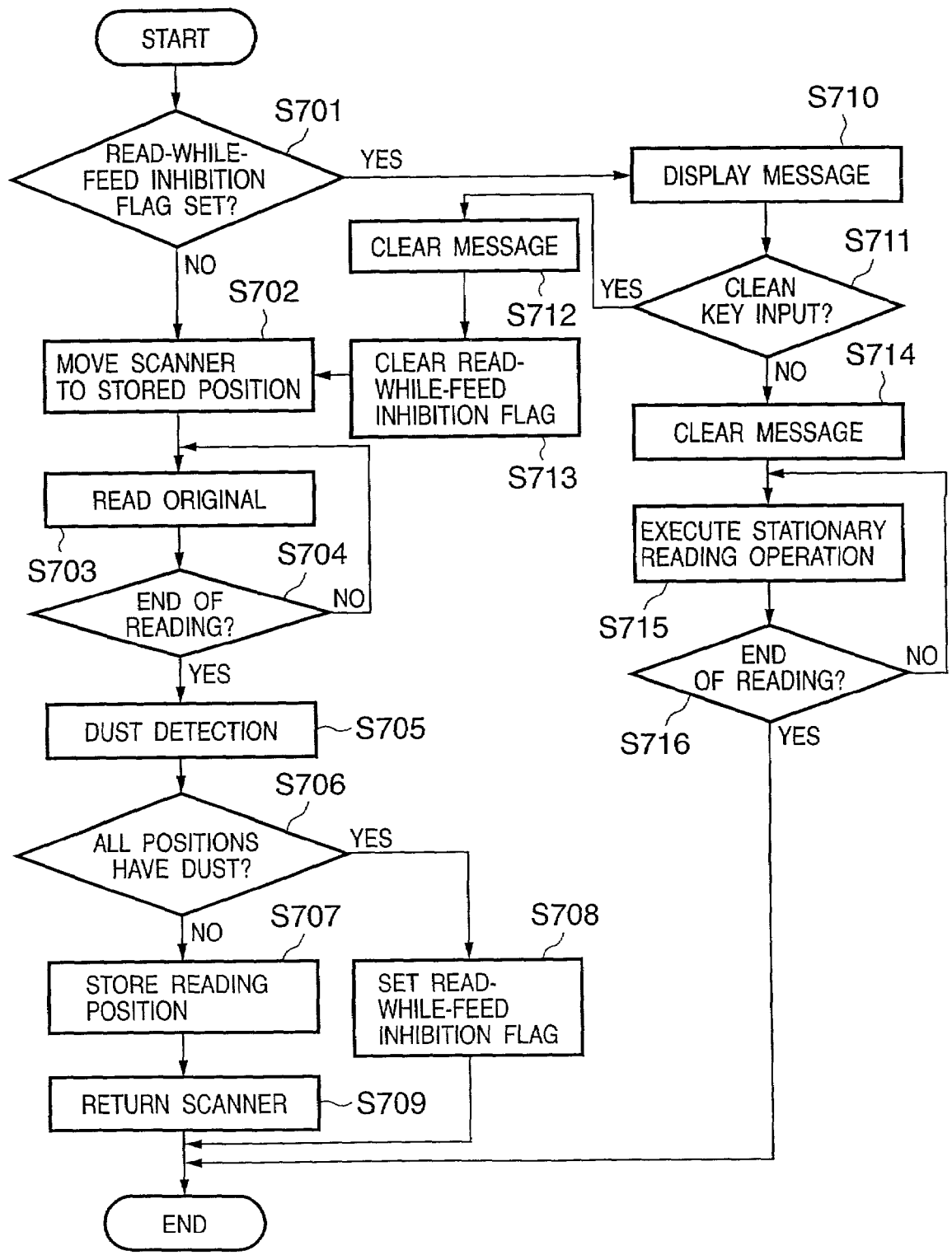
FIG. 19 is a flow chart showing a control method using a read-while-read inhibition flag according to a fourth embodiment of the present invention.

FIG. 19 is a flow chart showing the control method in a case of determining whether or not to perform a read-while-feed operation using a read-while-feed inhibition flag. This control starts when an original or originals are set, and a mode in which reading is executed by the read-while-feed operation is set.

First, in step S701, it is determined whether the read-while-feed inhibition flag is set. If NO in step S701, the read-while-feed operation can be executed, hence, the flow advances to step S702 to move a scanner 202 to a position that is stored as a reading position.

Thereafter, the flow advances to step S703 to feed the uppermost original, and reading processing by the read-while-feed operation is executed. The flow advances to step S704 to determine whether the fed original is the last original and the reading processing is ended. If NO in step S704, the flow returns to step S703 to continue the reading processing. If YES in step S704, the flow advances to step S705 to execute the dust detection operation.

Thereafter, the flow advances to step S706 to determine whether all the predetermined reading positions have dust or dirt as a result of dust detection in step S705. If any one of the positions has no dust or dirt, the flow advances to step S707 to store the position having no dust or dirt as the position to be used in the subsequent read-while-feed operation.

Then, the flow advances to step S709 to move the scanner 202 to a predetermined standby position, and the processing is ended. If it is determined in step S706 that all the predetermined reading positions have dust, the flow advances to step S708 to set the read-while-feed inhibition flag. Then, the flow advances to step S709.

Whereas, if YES in step S701, since an original can not be read properly by the read-while-feed operation, the flow advances to step S710 to notify a message as shown in FIG. 16 by display or sound to prompt the user to clean the platen glass 201. Thereafter, the flow advances to step S711 to determine whether cleaning is actually performed or not based on the user's key input.

If a clean key is input, it is determined that the cleaning is done, the message is cleared in step S712 and the read-while-feed inhibition is cleared in step S713. Thereafter, the flow advances to step S702 and the aforesaid processes are performed.

Whereas, if an OK key is input in step S711, then it is determined that cleaning is not done. Therefore, the reading method is switched to a stationary reading operation capable of normally reading the original with less influence of dust and/or dirt. The flow advances to step S714 where the message is cleared. Thereafter, the flow advances to step S715 to execute reading processing by the stationary reading operation.

Then, the flow advances to step S716 to determine whether the fed original is the last original and the reading processing is ended. If NO in step S716, the flow returns to step S715 to continue the reading processing. If YES in step S716, the processing is ended.

According to the fourth embodiment as described above, the read-while-feed inhibition flag which is turned ON when dust and/or dirt is detected at all the predetermined reading positions is used, thus whether or not the read-while-feed operation is proper is quickly determined in advance of the reading of an original. And if it is determined that the read-while-feed operation is improper, a cleaning operation is prompted to a user, the read-while-feed operation is inhibited until the cleaning operation is performed, and reading is performed in a stationary reading operation capable of reading an original with less influence of dust and/or dirt.

Further, if the read-while-feed operation is possible at any one of the predetermined reading positions, such a position is automatically detected. Thus, when there is no dust or dirt on the platen glass, or when it is possible to avoid the influence of the dust and/or dirt on the platen glass, the read-while-feed operation is performed to achieve the fast document reading operation while avoiding a problem in which a read image has black lines due to the dust and/or dirt on the platen glass. Accordingly, productivity of the reading operation can be improved.

It should be noted that whether or not the platen glass 201 is cleaned or not is determined based on the operation from the operation unit 172 in the fourth embodiment. However, the present invention is not limited to this, and it may be determined that the platen glass 201 is cleaned by a user when the automatic document feeder 6 is opened, and the read-while-feed operation may be allowed in turn.

It should be noted that the present invention includes combinations of the aforesaid embodiments or technical elements disclosed therein.

<Fifth Embodiment>

Figure 20:
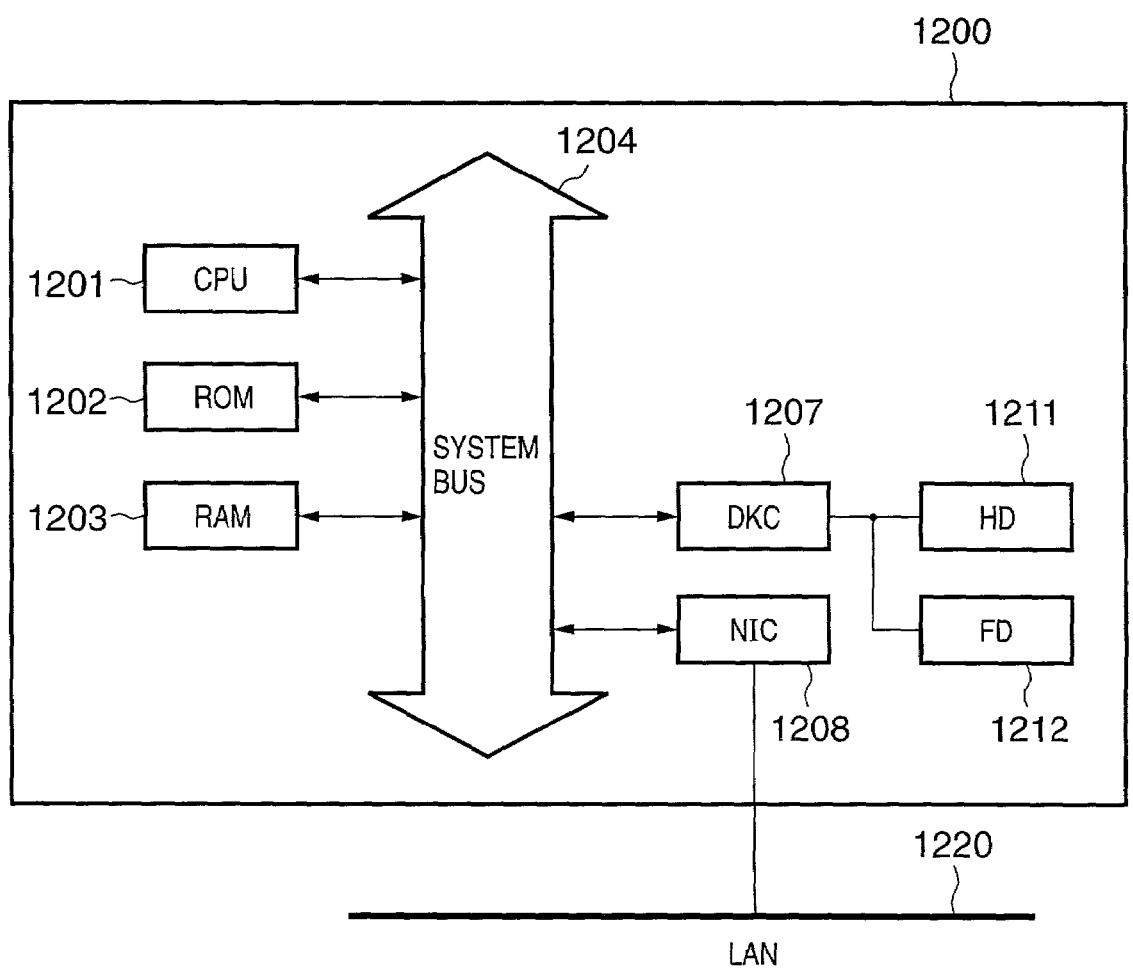
FIG. 20 is a block diagram showing an example of a computer system capable of forming an image reading apparatus according to a fifth embodiment of the present invention.

FIG. 20 is a block diagram of an internal configuration example of a computer system capable of configuring the image reading apparatus and method described in the first to fourth embodiments.

In FIG. 20, reference numeral 1200 denotes a computer (PC). The PC 1200 includes a CPU 1201 which executes a device control software stored in a ROM 1202 or a hard disk (HD) 1211 or provided from a floppy disk drive (FD) 1212, and controls the overall configurations connected to a system bus 1204.

Each function described in the first to fourth embodiments is implemented by the CPU 1201 and a program stored in the ROM 1202 or the hard disk 1211 of the PC 1200.

Reference numeral 1203 denotes a RAM and functions as a maim memory and a work area for the CPU 1201; and 1207, a disk controller (DKC) which controls an access to the hard disk 1211 and the floppy disk (FD) 1212 storing a boot program (a program to initiate execution of hardware and software of a personal computer), a plurality of applications, edition file, user file, network management program, and so on.

Reference numeral 1208 denotes a network interface card (NIC) for exchanging data with a network printer, other network devices, and other PCs via a LAN 1220.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts of FIGS. 12, and 13, 14, 15, 17, 18 and/or 19 described in the embodiments.

Further, the present invention includes combinations of the aforesaid embodiments or technical elements disclosed therein.

The present invention is not limited to the above embodiments and various changes and modifications can be made within the spirit and scope of the present invention. Therefore to apprise the public of the scope of the present invention, the following claims are made.

What is claimed is:

1. An image reading apparatus, comprising:
an image sensor adapted to read an image of an original;
a document feeder adapted to feed said original to a platen;
a detector adapted to detect presence/absence of dust and/or dirt on said platen; and
a controller adapted to notify the presence of dust and/or dirt on said platen in response to the detection of presence of dust or dirt by said detector, and clear the notification via a notification unit, and allow the read-while-feed operation when removal of dust and/or dirt on the platen is detected in a state that the read-while-feed operation is inhibited,
a document feeder for feeding an original to the platen,
wherein said controller determines that dust and/or dirt on the platen is removed in response to an opening operation of the document feeder.

2. The image reading apparatus according to claim 1, wherein when said detector does not detect dust and/or dirt at least at one of the a plurality of predetermined positions, said controller controls to perform the a read-while-feed operation, in which an original is read while being fed by said image sensor placed at a fixed position, at the position where no dust or dirt is detected.

3. The image reading apparatus according to claim 1, wherein said controller controls said detector to perform detection after a read-while-feed operation in which an original is read while being fed by said image sensor placed at a fixed position.

4. The image reading apparatus according to claim 1, wherein if said detector detects dust or dirt at all of the a plurality of predetermined positions, said controller notifies the presence of the dust or dirt on the platen via the notification unit right after the detection.

5. The image reading apparatus according to claim 1, wherein if said detector detects dust or dirt at all of the a plurality of predetermined positions, said controller notifies the presence of the dust or dirt on the platen via the notification unit in advance of a reading operation of an original.

6. The image reading apparatus according to claim 3 further comprising a memory adapted to, when said detector does not detect dust and/or dirt at least at one of the a plurality of predetermined positions, store the position having no dust or dirt,
wherein said controller controls to perform the read-while-feed operation at the stored position.

7. The image reading apparatus according to claim 1, wherein said apparatus is capable of performing a stationary reading operation in which an original is held at a fixed position on the platen and read while moving an said image sensor,
and wherein if said detector detects dust or dirt at all of the a plurality of predetermined positions, said controller sets to perform the stationary reading operation.

8. The image reading apparatus according to claim 1, wherein said controller turns on a flag indicative of inhibition of the a read-while-feed operation upon inhibiting to inhibit the read-while-feed operation in which an original is read while being fed by said image sensor placed at a fixed position in a case where dust or dirt is detected by said detector, and turns off the flag upon allowing the read-while-feed operation.

9. The image reading apparatus according to claim 8 further comprising a flag determination unit for determining on/off of the flag indicative of inhibition of the read-while-feed operation,
wherein said apparatus is capable of performing a stationary reading operation in which an original is held at a fixed position on the platen and read while moving an image sensor,
and wherein said controller controls to perform: the stationary reading operation when said flag determination unit determines that the flag is on, and controls to perform the read-while-feed operation when said flag determination unit determines that the flag is off.

10. The image reading apparatus according to claim 1 further comprising an operation unit adapted to designate disabling of said detector,
wherein said controller disables said detector in response to the designation by said operation unit.

11. The image reading apparatus according to claim 1 further comprising a size detector adapted to detect a size of an original, wherein plural sets of positions are prepared for different sizes of originals to be read as said plurality of predetermined positions, and said controller controls said detector to perform the detection at a plurality of predetermined positions depending upon the detected size of the original.

12. A control method for controlling an image reading apparatus capable of performing a read-while-feed operation in which an original is read while being fed by an image sensor placed at a fixed position, comprising:

reading an image of an original;

feeding said original to a platen;

detecting presence/absence of dust and/or dirt on said platen; and inhibiting the read-while-feed operation in a case where dust and/or dirt are detected at all of a plurality of predetermined positions;

notifying the presence of dust and/or dirt on said platen in response to the detection of presence of dust or dirt, and clearing the notification in response to an opening operation of a document feeder, via a notification unit in a case where dust and/or dirt are detected at all of a plurality of predetermined positions;

determining whether or not dust and/or dirt on the platen is removed in a state that the read-while feed operation is inhibited; and allowing the read-while-feed operation when removal of dust and/or dirt on the platen is determined, wherein the image reading apparatus comprises a document feeder for feeding an original to the platen, and it is determined that dust and/or dirt on the platen is removed in response to an opening operation of the document feeder.

13. The control method according to claim 12 further comprising controlling, when no dust or dirt is detected at least at one of the a plurality of predetermined positions, to perform the a read-while-feed operation, in which an original is read while being fed by an image sensor placed at a fixed position, at the position where no dust or dirt is detected.

14. The control method according to claim 12, wherein the detection of dust and/or dirt is performed after a read-while-feed operation in which an original is read while being fed by an image sensor placed at a fixed position.

15. The control method according to claim 12, wherein the notification of the presence of the dust or dirt on the platen is performed right after the detection.

16. The control method according to claim 12, wherein the notification of the presence of the dust or dirt on the platen is performed in advance of a reading operation of an original.

17. The control method according to claim 14 further comprising:

storing, when no dust or dirt is detected at least at one of the a plurality of predetermined positions, the position having no dust or dirt; and controlling to perform the read-while-feed operation at the stored position.

18. The control method according to claim 12, wherein the image reading apparatus is capable of performing a stationary reading operation in which an original is held at a fixed position on the platen and read while moving an image sensor, further comprising setting, if dust or dirt is detected at all of the a plurality of predetermined positions, to perform the stationary reading operation.

19. The control method according to claim 12 further comprising:

turning on a flag indicative of inhibition of the a read-while-feed operation upon inhibiting to inhibit the read-while-feed operation in which an original is read while being fed by an image sensor placed at a fixed position in a case where dust or dirt is detected by a detector; and turning off the flag upon allowing the read-while-feed operation.

20. The control method according to claim 19, therein the image reading apparatus is capable of performing a stationary reading operation in which an original is held at a fixed position on the platen and read while moving an image sensor, further comprising:

determining on/off of the flag indicative of inhibition of the read-while-feed operation;

controlling to perform the stationary reading operation when the flag is on; and controlling to perform the read-while-feed operation when the flag is off.

21. The control method according to claim 12, wherein the image reading apparatus comprises an operation unit adapted to designate skipping the detection of dust and/or dirt, further comprising skipping the detection of dust and/or dirt in response to the designation by said operation unit.

22. The control method according to claim 12 further comprising detecting a size of an original, wherein plural sets of positions are prepared for different sizes of originals to be read as said plurality of predetermined positions, and the detection of dust and/or dirt is performed at a plurality of predetermined positions depending upon the detected size of the original.

* * * * *

UNITED STATES PATENT AND TRADEMARK OFFICE
CERTIFICATE OF CORRECTION

PATENT NO. : 7,218,425 B2 Page 1 of 1
APPLICATION NO. : 10/022861
DATED : May 15, 2007
INVENTOR(S) : Saida et al.

It is certified that error appears in the above-identified patent and that said Letters Patent is hereby corrected as shown below:

On the Title Page:

Item "(56) References Cited", subsection, FOREIGN PATENT DOCUMENTS", change "JP 10-56542 3/1998" to --JP 10-56542 2/1998--.

Signed and Sealed this

Fifteenth Day of April, 2008

JON W. DUDAS
*Director of the United States Patent and Trademark Office*